(12) United States Patent
Nishimura et al.

(10) Patent No.: US 7,529,971 B2
(45) Date of Patent: May 5, 2009

(54) COMPOSITE MEMORY DEVICE, DATA WIRING METHOD AND PROGRAM

(75) Inventors: Hajime Nishimura, Kanagawa (JP); Takeshi Sasa, Miyagi (JP); Tetsuya Tamura, Kanagawa (JP); Kazuya Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 408 days.

(21) Appl. No.: 11/578,011

(22) PCT Filed: Apr. 12, 2005

(86) PCT No.: PCT/JP2005/007079

§ 371 (c)(1),
(2), (4) Date: Oct. 10, 2006

(87) PCT Pub. No.: WO2005/101211

PCT Pub. Date: Oct. 27, 2005

(65) Prior Publication Data

US 2007/0276882 A1    Nov. 29, 2007

(30) Foreign Application Priority Data

Apr. 12, 2004    (JP) ............................. 2004-117120

(51) Int. Cl.
*G06F 11/00* (2006.01)

(52) U.S. Cl. .......................................... 714/7
(58) Field of Classification Search .................... 714/5, 714/7, 15, 25, 30, 31, 42, 54
See application file for complete search history.

(56) References Cited

U.S. PATENT DOCUMENTS

| | | | | |
|---|---|---|---|---|
| 6,148,140 A | * | 11/2000 | Okada et al. | 386/105 |
| 7,103,713 B2 | * | 9/2006 | Saika et al. | 711/112 |
| 2001/0001870 A1 | * | 5/2001 | Ofek et al. | 711/112 |
| 2003/0081938 A1 | | 5/2003 | Nishimura et al. | |
| 2003/0225993 A1 | | 12/2003 | Yagisawa et al. | |
| 2004/0093474 A1 | * | 5/2004 | Lin et al. | 711/162 |

* cited by examiner

*Primary Examiner*—Nadeem Iqbal
(74) *Attorney, Agent, or Firm*—Frommer Lawrence & Haug LLP; William S. Frommer

(57) ABSTRACT

There is provided a composite memory device including a recording medium and nonvolatile recording medium and in which data is written to and read from the recording mediums on the basis of a common file system, the recording medium (10) having a first data area, the nonvolatile recording medium (11) having a second data area and an identification information table to manage the first and second data area collectively. The device further includes an information selector (14) to select positional information including predetermined identification information on the basis of the identification information table, converter (15) to convert positional information selected by the information selector (14) into position information corresponding to the first data area or into positional information corresponding to the second data area, first writing unit to write data supplied from a host device to the first data area and a second writing unit to write data supplied to the host device to the second data area.

13 Claims, 13 Drawing Sheets

| ID information (hexadecimal) in FAT | Meaning |
|---|---|
| 0000h | Corresponding cluster is "blank" |
| 0002h~FFF6h | Corresponding cluster is "already allocated" and corresponding value indicates number for next cluster |
| FFF7h | Corresponding cluster is "defective" |
| FFF8h~FFFFh | Indicates end of file (EOF) at which corresponding cluster is "already allocated" |

| 8 bytes | 3 bytes | 1 byte | 10 bytes | 2 bytes | 2 bytes | 2 bytes | 4 bytes |
|---|---|---|---|---|---|---|---|
| Name | Exten-sion | Attri-bute | Reservation | Time of recording | Data of recording | Top cluster No. | File length |

FIG.5

COMPOSITE MEMORY DEVICE, DATA WIRING METHOD AND PROGRAM

TECHNICAL FIELD

The present invention relates to a composite memory device including a recording medium and nonvolatile memory medium to write and read data on the basis of a common file system, and a data writing method and program, for writing data to the composite memory device.

This application claims the priority of the Japanese Patent Application No. 2004-117120 filed in the Japanese Patent Office on Apr. 12, 2004, the entirety of which is incorporated by reference herein.

BACKGROUND ART

A hard disk drive (HDD) has been used in the past as an external memory device for use with personal computers (PC) and the like. With the implemented technique for a higher recording density, the HDD has been improved to have a larger capacity, is used and will be used as an external memory device for use with consumer AV devices such as audio-visual (AV) home server, in-vehicle device, etc.

The hard disk has been designed in the past to have a smaller and smaller. For example, there has been proposed an HDD using a hard disk of 1.8 inches or 1 inch and intended for use in a mobile device such as digital still camera (DSC), portable music player or the like.

On the other hand, the nonvolatile semiconductor memory represented by the flash memory is advantageous in low power consumption, quick start-up, high shock resistance, etc. and has a capacity of more than 1 GB. Thus, the nonvolatile semiconductor memory is used in various applications with effective utilization of its advantages.

Note here that a small memory device for use in a mobile device should be inexpensive, have a large capacity, be low in power consumption, be able to respond quickly and have further advantageous features.

However, the HDD can start up, namely, can get ready for write or read of data in a few seconds after energized. On the other hand, the nonvolatile semiconductor memory can instantaneously start up when energized. Namely, the moment the memory is energized, it will get ready for data write or read.

Also, when the HDD is idling, namely, when it is in waiting state for data write or read, it is consuming the power uselessly, which will adversely affect the power availability in an HDD-based mobile device which uses a limited source of energy. Further, if any of the clusters on the track of the hard disk becomes defective, the data transfer rate will be deteriorated because a normal cluster has to be substituted for the defective one.

There has been proposed a hybrid storage device in which an HDD and nonvolatile semiconductor memory is combined to compensate for the problems of the HDD with the advantages of the nonvolatile semiconductor memory. The Inventors has proposed various hybrid storage devices in which an HDD and nonvolatile semiconductor memory are managed by a single file system as in the Japanese Patent Laid Open Nos. 2003-123379 (will be referred to as "Patent Document 1" hereunder), 2003-125358 (will be referred to as "Patent Document 2" hereunder), 2002-150699 (will be referred to as "Patent Document 3" hereunder) and 2000-324435 (will be referred to as "Patent Document 4" hereunder).

Note that necessary system data for access to software and data for controlling an HDD controller in an HDD is stored in a predetermined area of a hard disk and cannot be read unless the HDD starts up. Therefore, even after energized, the hybrid storage device cannot be used for a while until the system data is read from the hard disk. On this account, the Patent Document 1 proposes that the system data is stored in the nonvolatile semiconductor memory so that the hybrid storage device is operable immediately after energized.

Also the HDD takes a few seconds until it can record or reproduce data. That is, it cannot record or reproduce data to or from itself before it starts up (reaches a predetermined velocity of rotation). The Patent Document 2 proposes that for recording data, a leading portion of the data for a predetermined length of time from the data top is written to the nonvolatile semiconductor memory and the data portion following the leading portion is written to the HDD having been started up, while for reproducing the written data, the data written in the nonvolatile semiconductor memory is read and the data written in the HDD started up, so that data can be recorded or reproduced immediately after the hybrid storage device is energized.

The Patent Document 3 proposes that the nonvolatile semiconductor memory is used as a spare area for a defective sector as well to prevent the transfer rate from being lowered.

In case an HDD is used in a video camera or the like, when power supply to the HDD is suddenly interrupted because the video camera is dropped or applied with a shock with the result that no file system is registered, data will not be reproducible. To avoid this, it is necessary to periodically update the file system in a predetermined area in the HDD, which however will cause the recording speed to be lowered considerably. On this account, the Patent Document 4 proposes that an area in which the file system to be updated is allocated to the nonvolatile semiconductor memory to protect data without lowering the transfer rate.

The nonvolatile semiconductor memory being used only as a transient data area while the HDD is used in a steady state, a combination of the small-capacity nonvolatile semiconductor memory and large-capacity HDD provides a low-cost, high-performance storage device.

Note here that in the hybrid storage device, it is important to efficiently utilize the small-capacity nonvolatile semiconductor memory in order to assure that the hybrid storage data is inexpensive. If a host device accessing the hybrid storage device writes data to the HDD area and nonvolatile semiconductor memory area without differentiation between the areas, the nonvolatile semiconductor memory area will be consumed to the full extent without making the most of its advantage.

It is possible that a DSC, potable music player, video camera or the like as a host device accesses the hybrid storage device. The latest DSC and the like is connectable to a PC (personal computer), and the PC can read a content recorded in a storage medium incorporated in the DSC or write data to the storage medium. Also, a removable storage device to which data has been recorded by the DSC can be connected to the PC, and the PC can read or write data from or to the removable storage device.

However, since the general purpose device such as PC manages data on the basis of a predetermined file system, so it cannot make recognition between the nonvolatile semiconductor memory area and HDD area in the hybrid storage device. That is, since the general-purpose device such as PC can only recognize the hybrid storage device as one storage, it is adapted to start data record to the nonvolatile semiconductor memory area and record data to the HDD area when the nonvolatile semiconductor memory area becomes full of the recorded data or to record data to the HDD area after the HDD is started up and record data to the nonvolatile semiconductor memory area when the HDD area becomes full of the recorded data. Namely, the advantage of the hybrid storage device cannot effectively be utilized.

DISCLOSURE OF THE INVENTION

It is therefore desirable to provide a composite memory device having a nonvolatile semiconductor memory area and HDD area and to and from which data can be recorded and reproduced with effective utilization of the advantage thereof, a method of writing data to the composite memory device and a program for writing data to the composite memory device.

According an embodiment of the present invention, there is provided a composite memory device including:

a recording medium having a first data area assigned a first physical address;

a nonvolatile recording medium having a second data area assigned a second physical address, and an identification information table assigned logical addresses for managing the first and second physical addresses and having predetermined identification information written therein at each of the logical addresses;

an interface to which a host device is to be connected;

a recognizing means for recognizing a host device connected to the interface;

an identification information table reading means for reading the identification information table from the nonvolatile recording medium;

an information selecting means for selecting a logical address where the predetermined identification information is written on the basis of the result of recognition supplied from the recognizing means and identification information table read by the identification information table reading means;

a converting means for converting a logical address selected by the identification information selecting means into a first predetermined physical address corresponding to the first data area and into a second predetermined physical address corresponding to the second data area;

a data allocating means for allocating data supplied from the host device connected to the interface to the first or second data area on the basis of the conversion made by the converting means;

a first wiring means for writing the data allocated to the first data area by the data allocating means at a predetermined location in the first data area on the basis of the first physical address; and a second writing means for writing the data allocated to the second data area by the data allocating means on the basis of the second physical address.

Also, according to another embodiment of the present invention, there is provided a method of writing data to a composite memory device including a recording medium having a first data area assigned a first physical address, a nonvolatile recording medium having a second data area assigned a second physical address, and an identification information table assigned logical addresses for managing the first and second physical addresses and having predetermined identification information written therein at each of the logical addresses, and an interface to which a host device is to be connected, the method including:

a recognizing step of recognizing a host device connected to the interface;

an identification information table reading step of reading the identification information table from the nonvolatile recording medium;

an information selecting step of selecting a logical address where the predetermined identification information is written on the basis of the result of recognition supplied from the recognizing step and identification information table read in the identification information table reading step;

a converting step of converting a logical address selected in the identification information selecting step into a first predetermined physical address corresponding to the first data area and into a second predetermined physical address corresponding to the second data area;

a data allocating step of allocating data supplied from the host device connected to the interface to the first or second data area on the basis of the conversion made in the converting step;

a first writing step of writing the data allocated to the first data area in the data allocating step at a predetermined location in the first data area on the basis of the first physical address; and a second writing step of writing the data allocated to the second data area in the data allocating step on the basis of the second physical address.

Also, according to another embodiment of the present invention, there is provided a program for having a computer write data to a composite memory device including a recording medium having a first data area assigned a first physical address, a nonvolatile recording medium having a second data area assigned a second physical address, and an identification information table assigned logical addresses for managing the first and second physical addresses and having predetermined identification information written therein at each of the logical addresses, and an interface to which a host device is to be connected, the program including:

a recognizing step of recognizing a host device connected to the interface;

an identification information table reading step of reading the identification information table from the nonvolatile recording medium;

an information selecting step of selecting a logical address where the predetermined identification information is written on the basis of the result of recognition supplied from the recognizing step and identification information table read in the identification information table reading step;

a converting step of converting a logical address selected in the identification information selecting step into a first predetermined physical address corresponding to the first data area and into a second predetermined physical address corresponding to the second data area;

a data allocating step of allocating data supplied from the host device connected to the interface to the first or second data area on the basis of the conversion made in the converting step;

a first writing step of writing the data allocated to the first data area in the data allocating step at a predetermined location in the first data area on the basis of the first physical address; and a second writing step of writing the data allocated to the second data area in the data allocating step on the basis of the second physical address.

Also, according to another embodiment of the present invention, there is provided a composite memory device including:

a recording medium having a first data area assigned a first physical address;

a nonvolatile recording medium having a second data area assigned a second physical address, and a first identification information table assigned logical addresses for managing the first and second physical addresses and having written therein identification information that data write at the physical addresses is refused and a second identification information table assigned logical addresses corresponding to the second physical address and having predetermined identification is written at each of the logical addresses;

an interface to which a host device is to be connected;

a recognizing means for recognizing a host device connected to the interface;

an identification information table reading means for reading the first identification information table or the first and second identification information tables from the nonvolatile recording medium on the basis of the result of recognition supplied from the recognizing means;

an information selecting means for selecting a logical address where the predetermined identification information is written on the basis of the first identification information table or the first and second identification information tables read by the identification information table reading means;

a converting means for converting a logical address selected by the identification information selecting means into a first predetermined physical address corresponding to the first data area and into a second predetermined physical address corresponding to the second data area;

a data allocating means for allocating data supplied from the host device connected to the interface to the first or second data area on the basis of the conversion made by the converting means;

a first wiring means for writing the data allocated to the first data area by the data allocating means at a predetermined location in the first data area on the basis of the first physical address; and a second writing means for writing the data allocated to the second data area by the data allocating means on the basis of the second physical address.

Also, according to another embodiment of the present invention, there is provided a method of writing data to a composite memory device including a recording medium having a first data area assigned a first physical address, a nonvolatile recording medium having a second data area assigned a second physical address, and a first identification information table assigned logical addresses for managing the first and second physical addresses and having written therein identification information that data write at the physical addresses is refused and a second identification information table assigned logical addresses corresponding to the second physical address and having predetermined identification is written at each of the logical addresses, and an interface to which a host device is to be connected, the method including:

a recognizing step of recognizing a host device connected to the interface;

an identification information table reading step of reading the first identification information table or the first and second identification information tables from the nonvolatile recording medium on the basis of the result of recognition supplied from the recognizing means;

an information selecting step of selecting a logical address where the predetermined identification information is written on the basis of the first identification information table or the first and second identification information tables read in the identification information table reading step;

a converting step of converting a logical address selected in the identification information selecting step into a first predetermined physical address corresponding to the first data area and into a second predetermined physical address corresponding to the second data area;

a data allocating step of allocating data supplied from the host device connected to the interface to the first or second data area on the basis of the conversion made in the converting means;

a first wiring step of writing the data allocated to the first data area in the data allocating means at a predetermined location in the first data area on the basis of the first physical address; and a second writing step of writing the data allocated to the second data area in the data allocating step on the basis of the second physical address.

Also, according to another embodiment of the present invention, there is provided a program for having a computer write data to a composite memory device including a recording medium having a first data area assigned a first physical address, a nonvolatile recording medium having a second data area assigned a second physical address, and a first identification information table assigned logical addresses for managing the first and second physical addresses and having written therein identification information that data write at the physical addresses is refused and a second identification information table assigned logical addresses corresponding to the second physical address and having predetermined identification is written at each of the logical addresses, and an interface to which a host device is to be connected, the program including:

a recognizing step of recognizing a host device connected to the interface;

an identification information table reading step of reading the first identification information table or the first and second identification information tables from the nonvolatile recording medium on the basis of the result of recognition supplied from the recognizing means;

an information selecting step of selecting a logical address where the predetermined identification information is written on the basis of the first identification information table or the first and second identification information tables read in the identification information table reading step;

a converting step of converting a logical address selected in the identification information selecting step into a first predetermined physical address corresponding to the first data area and into a second predetermined physical address corresponding to the second data area;

a data allocating step of allocating data supplied from the host device connected to the interface to the first or second data area on the basis of the conversion made in the converting means;

a first wiring step of writing the data allocated to the first data area in the data allocating means at a predetermined location in the first data area on the basis of the first physical address; and a second writing step of writing the data allocated to the second data area in the data allocating step on the basis of the second physical address.

Also, according to another embodiment of the present invention, there is provided a composite memory device including:

a recording medium having a first data area assigned a first physical address;

a nonvolatile recording medium having a second data area assigned a second physical address, a first identification information table assigned a second data area assigned a second physical address and having predetermined identification information written at the first logical address and a second identification information table assigned a second logical address corresponding to the second physical address and having predetermined identification information written at the second logical address;

an interface to which a host device is to be connected;

a recognizing means for recognizing a host device connected to the interface;

an identification information table reading means for reading the first and second identification information tables from the nonvolatile recording medium on the basis of the result of recognition supplied from the recognizing means;

a first information selecting means for selecting the first logical address where the predetermined identification information is written from the first identification information table read by the identification information table reading means;

a second information selecting means for selecting the second logical address where the predetermined identification information is written from the second identification information table read by the identification information table reading means on the basis of the result of recognition supplied from the recognizing means;

a conversion table generating means for generating a conversion table in which the first logical address selected by the first information selecting means and second logical address selected by the second information selecting means are associated with each other;

a converting means for converting the first logical address selected by the first identification information selecting means into a first predetermined physical address corresponding to the first data area and the second logical address selected by the second information selecting means into a second predetermined physical address corresponding to the second data area;

a data allocating means for allocating data supplied from the host device connected to the interface to the first or second data area on the basis of the conversion made by the converting means;

a first wiring means for writing the data allocated to the first data area by the data allocating means at a predetermined location in the first data area on the basis of the first physical address converted by the converting means;

a second writing means for writing the data allocated to the second data area by the data allocating means at a predetermined location in the second data area on the basis of the second physical address converted by the converting means; and a third writing means for writing data written in the second data area by the second writing means at a predetermined location in the first data area on the basis of the conversion table generated by the conversion table generating means.

Also, according to another embodiment of the present invention, there is provided a method of writing data to a composite memory device including a recording medium having a first data area assigned a first physical address, a nonvolatile recording medium having a second data area assigned a second physical address, a first identification information table having a second data area assigned a second physical address and having predetermined identification information written at the first logical address and a second identification information table assigned a second logical address corresponding to the second physical address and having predetermined identification information written at the second logical address, and an interface to which a host device is to be connected, the method including:

a recognizing step of recognizing a host device connected to the interface;

an identification information table reading step of reading the first and second identification information tables from the nonvolatile recording medium on the basis of the result of recognition supplied from the recognizing step;

a first information selecting step of selecting the first logical address where the predetermined identification information is written from the first identification information table read in the identification information table reading step;

a second information selecting step of selecting the second logical address where the predetermined identification information is written from the second identification information table read in the identification information table reading step on the basis of the result of recognition supplied from the recognizing step;

a conversion table generating step of generating a conversion table in which the first logical address selected in the first information selecting step and second logical address selected by the second information selecting means are associated with each other;

a converting step of converting the first logical address selected in the first identification information selecting step into a first predetermined physical address corresponding to the first data area and the second logical address selected in the second information selecting step into a second predetermined physical address corresponding to the second data area;

a data allocating step of allocating data supplied from the host device connected to the interface to the first or second data area on the basis of the conversion made in the converting means;

a first wiring step of writing the data allocated to the first data area in the data allocating step at a predetermined location in the first data area on the basis of the first physical address converted in the converting step;

a second writing step of writing the data allocated to the second data area in the data allocating step at a predetermined location in the second data area on the basis of the second physical address converted in the converting step; and a third writing step of writing data written in the second data area in the second writing step at a predetermined location in the first data area on the basis of the conversion table generated in the conversion table generating step.

Also, according to another embodiment of the present invention, there is provided a program for having a computer write to a composite memory device including a recording medium having a first data area assigned a first physical address, a nonvolatile recording medium having a second data area assigned a second physical address, a first identification information table having a second data area assigned a second physical address and having predetermined identification information written at the first logical address and a second identification information table having a second logical address corresponding to the second physical address and having predetermined identification information written at the second logical address, and an interface to which a host device is to be connected, the method including:

a recognizing step of recognizing a host device connected to the interface;

an identification information table reading step of reading the first and second identification information tables from the nonvolatile recording medium on the basis of the result of recognition supplied from the recognizing step;

a first information selecting step of selecting the first logical address where the predetermined identification information is written from the first identification information table read in the identification information table reading step;

a second information selecting step of selecting the second logical address where the predetermined identification information is written from the second identification information table read in the identification information table reading step on the basis of the result of recognition supplied from the recognizing step;

a conversion table generating step of generating a conversion table in which the first logical address selected in the first information selecting step and second logical address selected by the second information selecting means are associated with each other;

a converting step of converting the first logical address selected in the first identification information selecting step into a first predetermined physical address corresponding to the first data area and the second logical address selected in the second information selecting step into a second predetermined physical address corresponding to the second data area;

a data allocating step of allocating data supplied from the host device connected to the interface to the first or second data area on the basis of the conversion made in the converting means;

a first wiring step of writing the data allocated to the first data area in the data allocating step at a predetermined location in the first data area on the basis of the first physical address converted in the converting step;

a second writing step of writing the data allocated to the second data area in the data allocating step at a predetermined location in the second data area on the basis of the second physical address converted in the converting step; and a third writing step of writing data written in the second data area in the second writing step at a predetermined location in the first data area on the basis of the conversion table generated in the conversion table generating step.

In the composite memory device as one embodiment of the present invention, since the operation of data write to the data area is limited according to the type of the host device, even in case data write is made from a general-purpose device, no data write will be made to the data area in the nonvolatile recording medium unless the entire data area in the recording medium is "already allocated". Therefore, even after data write is made from the general-purpose device, the composite memory device permits a dedicated host device can write data to the recording medium low in bit cost and nonvolatile recording medium advantageous in quick response, low power consumption, etc. with effective utilization of the advantages of these recording media.

Also in the data writing method and program as other embodiments of the present invention, since data is written to the composite memory device that limits the operation of data write to the data area according to the type of the host device, in case a general-purpose host device is connected to the composite memory device, no data write will be made to the data area in the nonvolatile recording medium unless the entire data area in the recording medium is "already allocated". Therefore, even after data write is made from the general-purpose device, each of the method and program permits a dedicated host device to write data to the recording medium low in bit cost and nonvolatile recording medium advantageous in quick response, low power consumption, etc. with effective utilization of the advantages of these recording media.

Also in the composite memory device as another embodiment of the present invention, since the operation of data write to the data area is limited according to the type of the host device, in case data write is made from a general-purpose device, no data write will be made because it is inhibited to write data to the entire data area in the nonvolatile recording medium. Therefore, even after data write is made from the general-purpose device, the composite memory device permits a dedicated host device to write data to the recording medium low in bit cost and nonvolatile recording medium advantageous in quick response, low power consumption, etc. with effective utilization of the advantages of these recording media.

Also in the data writing method and program as other embodiments of the present invention, since data is written to the composite memory device that limits the operation of data write to the data area according to the type of the host device, in case data write is made from a general-purpose host device, no data write will be made to the data area in the nonvolatile recording medium because it is inhibited to write data to the entire data area in the nonvolatile recording medium. Therefore, even after data write is made from the general-purpose device, each of the method and program permits a dedicated host device to write data to the recording medium low in bit cost and nonvolatile recording medium advantageous in quick response, low power consumption, etc. with effective utilization of the advantages of these recording media.

Also, since the composite memory device as another embodiment of the present invention has an FAT open to external devices and which manages the data area of the recording medium and an FAT used only in the recording medium and which manages the data area of the nonvolatile recording medium, limits the data write to the data area according to the type of a host device connected to the interface and copies data written in the data area of the nonvolatile recording medium to the data area in the recording medium after completion of the data write, so no general-purpose host device can neither write nor read data to or from the data area of the recording medium. Even after data write is made from the general-purpose device, the composite memory device permits a dedicated host device to write data to the recording medium low in bit cost and nonvolatile recording medium advantageous in quick response, low power consumption, etc. with effective utilization of the advantages of these recording media.

Also, since each of the method and program as other embodiments of the present invention has an FAT open to external devices and which manages the data area of the recording medium and an FAT used only in the recording medium and which manages the data area of the nonvolatile recording medium, write data to the composite memory device which limits the data write to the data area according to the type of a host device connected to the interface, so in case the host device connected to the interface is a general-purpose one, no data is written to the data area of the nonvolatile recording medium, while in case the connected host device is a dedicated one, data is written to the nonvolatile recording medium and the written data is copied to the recording medium. Therefore, since no access to the data area of the nonvolatile recording medium is permitted for both data write and read in case a general-purpose host device is connected to the interface of the composite memory device, even after data write is made from the general-purpose device, each of the method and program permits a dedicated host device to write data to the recording medium low in bit cost and nonvolatile recording medium advantageous in quick response, low power consumption, etc. with effective utilization of the advantages of these recording media.

The foregoing and other features, aspects and advantages of the present invention will be come apparent from the following detailed description of embodiments of the present invention when taken in conjunction with the accompanying drawings.

BRIEF DESCRIPTION OF THE DRAWINGS

FIG. 5 shows the configuration of a directory area.

BEST MODE FOR CARRYING OUT THE INVENTION

The present invention is directed to a composite memory device including a hard disk drive (HDD) having a disk-shaped recording medium installed therein and a nonvolatile recording medium such as flash memory or the like and in which a data area of the HDD and data area of the nonvolatile recording medium are handled as an integral area on the basis of a predetermined file system. It should be noted that an example in which an MS-DOS-compatible FAT (File Allocation Table) file system is adopted as the file system will be explained below.

Figure 1:
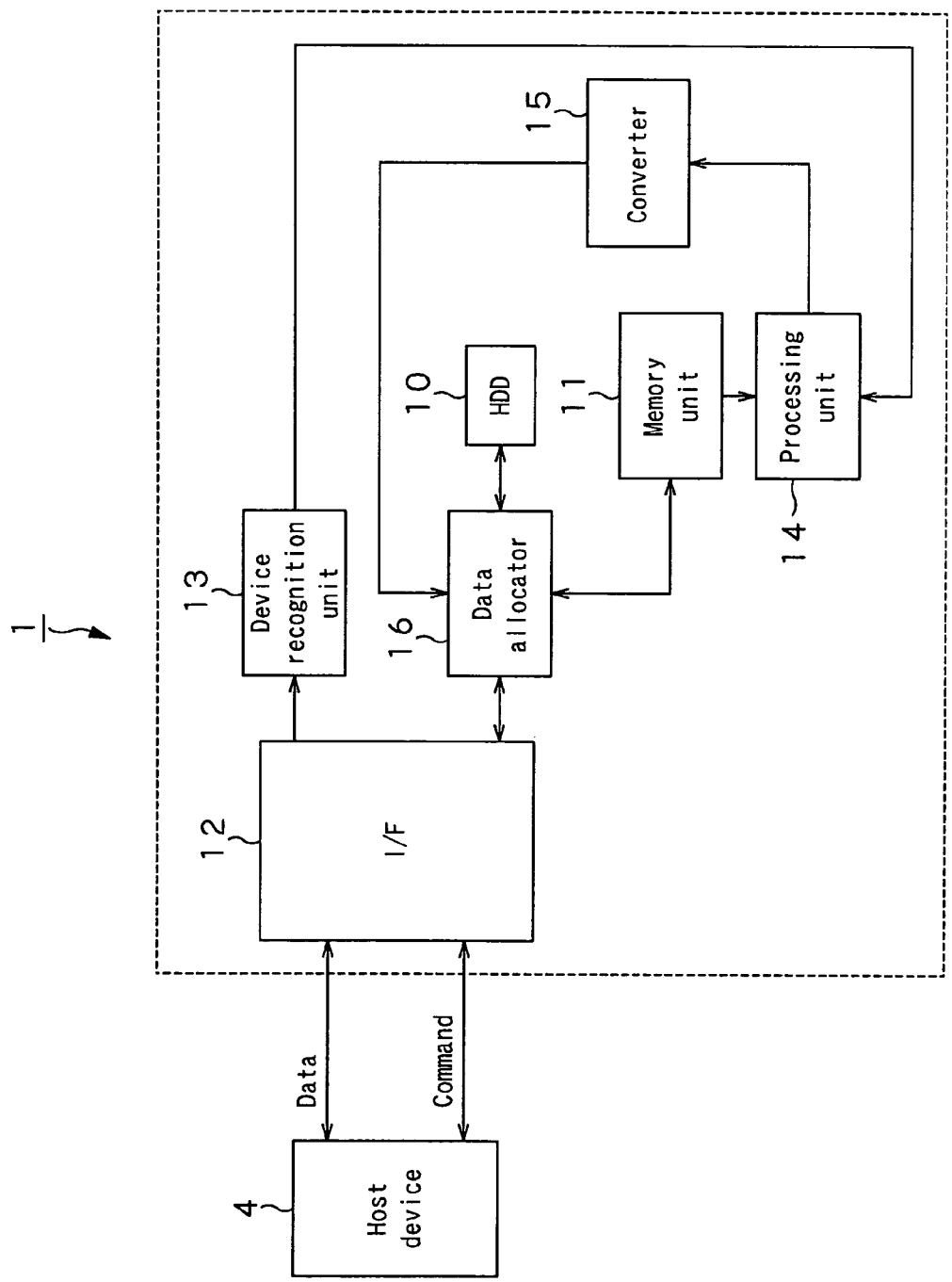
FIG. 1 is a block diagram of the composite memory device as an embodiment of the present invention.

As shown in FIG. 1, the composite memory device, generally indicated with a reference numeral 1, includes an HDD 10 having installed therein a recording medium 2 having a data area A in which an address (which address will be referred to as "physical address" hereunder) is assigned to data having at least a predetermined size, a memory unit 11 including a nonvolatile recording medium 3 having a data area B in which a series of addresses starting with the top address in the data area A is assigned to each data having a predetermined size and identification information tables each having predetermined identification information written at each memory predetermined address (will be referred to as "logical address" hereunder) therein, a device recognition unit 13 to recognize a host device 4, a processing unit 14 to read the identification information table from the nonvolatile recording medium 3 and select a logical address where predetermined identification information is written on the base of the result of the recognition made by the device recognition unit 13, a converter 15 to convert a logical address selected by the processing unit 14 into a physical address corresponding to the data area A or into a memory address corresponding to the data area B, on the basis of a predetermined one of the identification information tables, and data allocator 16 to assign data supplied from the host device 4 to HDD 10 or memory unit 11 on the basis of the physical address or memory address resulted from the conversion made in the converter 15. The composite memory device (will be referred to simply as "device" wherever appropriate hereunder) 1 is connected to the host device 4 such as a dedicated or general-purpose one via an interface 12 complying with any one of the standards IDE, SCSI, FC or USB.

Figure 12:
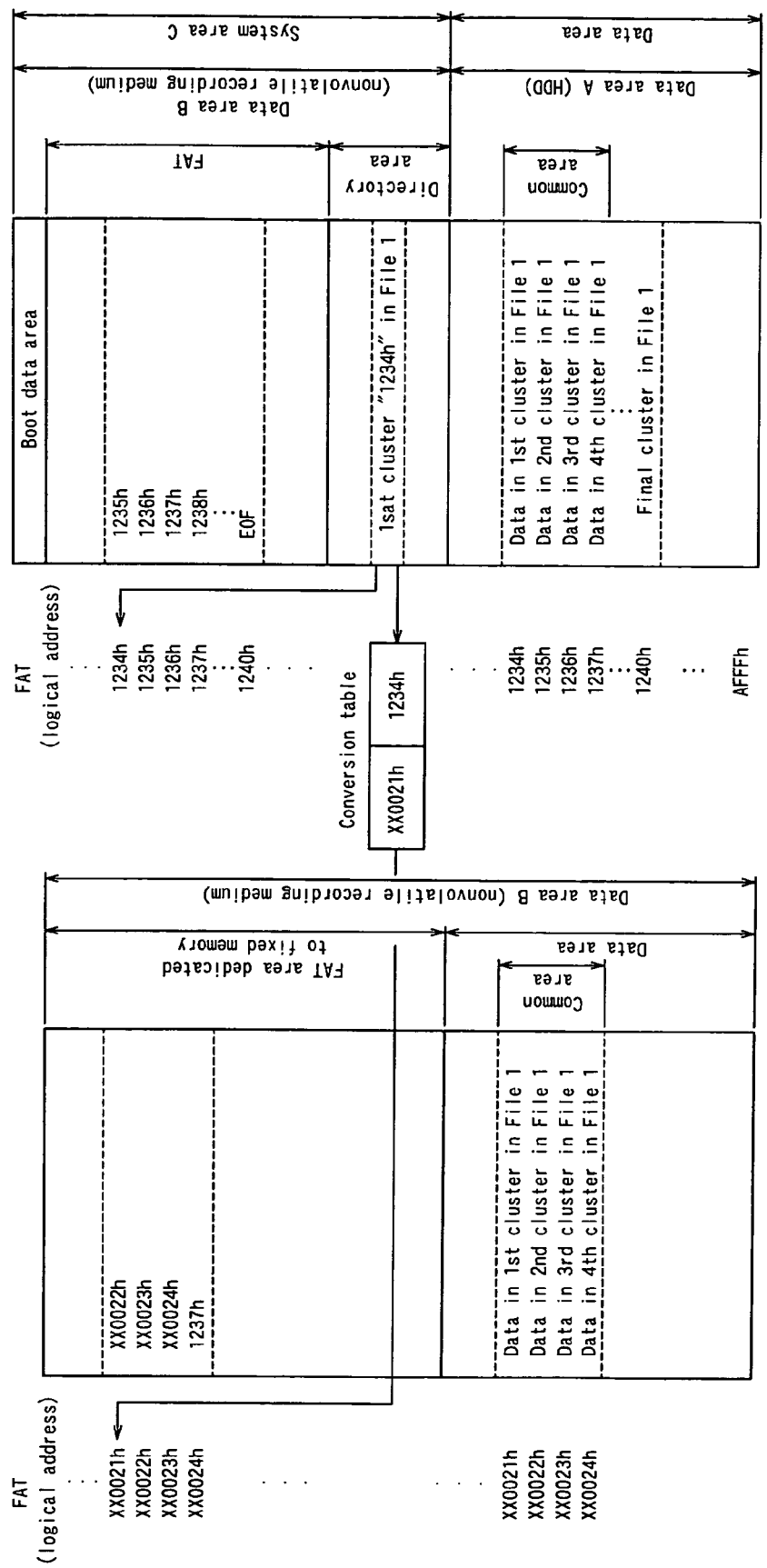
FIGS. 12A and 12B show a third configuration of the data area A and data area B.

Note that the data areas A and B will be described in detail later with reference to FIGS. 8, 9 and 12.

Also note that the "dedicated host device" is an application device such as video camera, digital camera, music player or the like, capable of recording and reproducing data efficiently on the basis of the advantage of the composite memory device 1. It is, for example, a device capable of issuing, when put into operation, an Identify Device Command (as in the ATA standard) to the device 1 and acquiring parameter information on the device 1, to thereby recognizing easily that the device 1 is a combination of the recording medium 2 and nonvolatile recording medium 3. It should be noted that in this embodiment, the "dedicated host device" can recognize the device 1, that is, can make differentiation between the HDD 10 and memory unit 11, which will be described in detail later.

On the other hand, the "general-purpose" host device is a device capable of recording and reproducing data on the basis of a peculiar file system, such as personal computer. The general-purpose host device cannot accurately recognize a memory device having a configuration not defined in the file system. It should be noted that in this embodiment, the "general-purpose host device" can recognize the composite memory device 1 as a single data area without being able to recognize the device 1, that is, make differentiation between the HDD 10 and memory unit 11.

Figure 2:
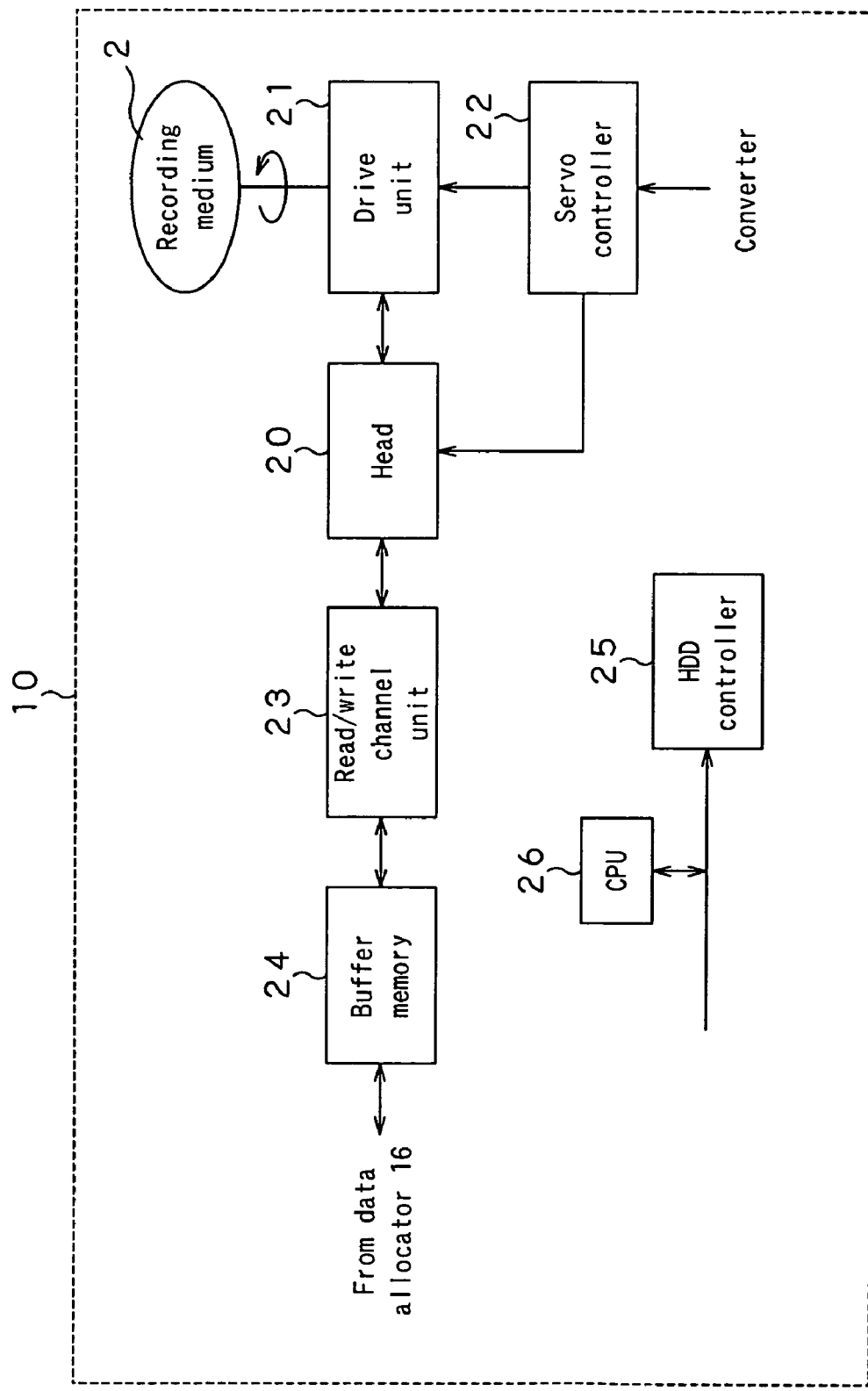
FIG. 2 is also a block diagram of an HDD included in the composite memory device shown in FIG. 1.

As shown in FIG. 2, the HDD 10 includes a read/write head 20 to write data to the recording medium 2 and read data from the recording medium 2, a drive unit 21 to rotate the recording medium 2 at a predetermined velocity in a predetermination direction, a servo controller 22 to control the head 20 and drive unit 21, a read/write channel unit 23 to process supplied data in a predetermined manner, a buffer memory 24 to provisionally save data, an HDD controller 25 to control the servo controller 22 and read/write channel unit 23, a processor (CPU) 26 that makes a predetermination computation to set a necessary command and parameter for operation of the servo controller 22, read/write channel unit 23, etc., and the recording medium 2 to which data is written and from which data is read.

The servo controller 22 controls the drive unit 21 to rotate the recording medium 2 at a predetermined velocity in a predetermined direction, and also controls the driving of the read/write head 20 for access to a predetermined location in the recording medium 2, corresponding to a physical address supplied from the converter 15.

The read/write channel unit 23 operates, at the time of data writing, to encode (modulate) data supplied from the data allocator 16 and convert the encoded data into a digital bit string matching the characteristic of the recording/reproduction system, and then supply the converted data to the head 20. Also, the read/write channel unit 23 operates, at the time of data reading, to remove a high-frequency noise from a read signal supplied from the head 20 and then digitize the read signal by an analog-digital converter (ADC), process the digital signal by the maximum likelihood decoding or the like, and then demodulate the decoded signal.

The buffer memory 24 is controlled by the HDD controller 25, at the time of data writing, to provisionally save data supplied from the host device 4 via the data allocator 16. When the data amount in the buffer memory 24 has reached a predetermined one, data is read from the buffer memory 24 and the read data is supplied to the read/write channel unit 23. Also, the buffer memory 24 is controlled by the HDD controller 25, at the time of data reading, to provisionally save data supplied from the read/write channel unit 23. When the data amount in the buffer memory 24 has reached the predetermined one, data is read from the buffer memory 24 and the read data is supplied to the host device 4 via the data allocator 16 and interface 12. Also, the buffer memory 24 operates, at the time of data reading and writing, to provisionally save data. Thus, it is prevented from being deteriorated in performance due to a difference in transfer rate between data.

The HDD controller 25 manages data transfer between the buffer memory 24 and read/write channel unit 23 and between the buffer memory 24 and data allocator 16 on the basis of the FAT file system which will be described in detail later, and processes the data with respect to a format. Also, the HDD controller 25 processes the data with respect to encoding, error detection and error correction with an error correction code during the format elated data processing.

Also, the recording medium 2 is a disk-shaped one, and has the data area A managed on the basis of the FAT system and in which a physical address is assigned to data having each predetermined size depending upon an intended data format.

Figures 3, 4:
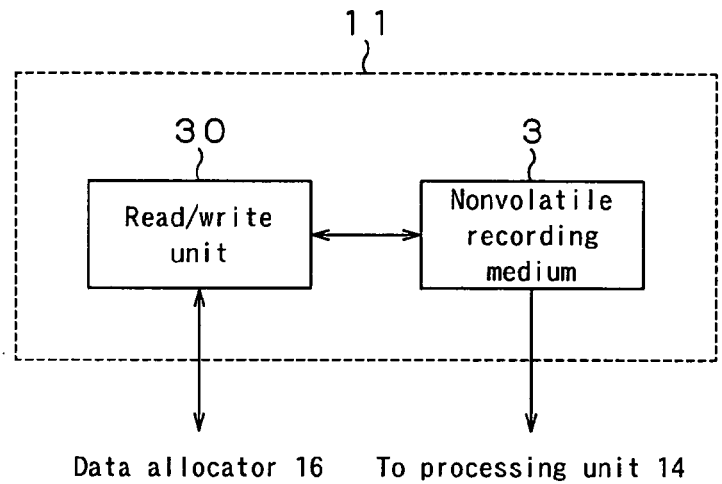
FIG. 3 is a block diagram of a memory unit included in the composite memory device shown in FIG. 1.
FIG. 4 shows the meaning of identification information.

As shown in FIG. 3, the memory unit 11 includes the nonvolatile recording medium 3 and a read/write unit 30 that writes data supplied from the data allocator 16 to the nonvolatile recording medium 3 and reads data from the nonvolatile recording medium 3, on the basis of a memory address converted by the converter 15.

The nonvolatile recording medium 3 is, for example, a NAND type flash memory card (memory stick, compact flash, SD card or the like) adopting the FAT file system, and has the data area B in which a series of addresses (memory addresses) starting with the top address in the data area A of the recording medium 2 is assigned to each data having a predetermined size and identification information tables each having predetermined identification information written at each predetermined memory address.

In this embodiment, the data area A in the recording medium 2 and data area in the nonvolatile recording medium 3 are integrated based on the FAT (File Allocation Table) file system and managed as an integral data area.

Here will be explained the FAT file system. The "FAT" is a table showing how a file is stored in a cluster, and provides a format system to manage the host device 4 on the basis of this table. The "formatting" is a process of zoning and rearranging a data memory area by areas each having a predetermined size and assigning a number (physical address) to each of the zoned and rearranged areas. The formatting consists of a so-called physical formatting in which a track formed on the recording medium 2 is divided into areas called "sectors", and a so-called logical formatting in which a plurality of the sectors is organized as a unit called "cluster" to define a system area C, disk area and data area.

Also, one sector is a minimum unit (normally of 512 bytes) for recording data in the recording medium 2. The present invention also adopts the sector as the minimum unit for data recording. The host device 4 uses a logical block address (LBA) to access the recording medium 2. Also, in the FAT file system to manage the files, a plurality of sectors (N sectors) is taken as one cluster and one cluster is taken as a minimum unit for write and read of data.

The system area C generated according to the format includes a FAT area in which a master boot record and FAT are written. The master boot record is a sector at an address LBA "0" as viewed from the host device 4 and has a bootstrap code and partition table recorded therein.

As shown in FIG. 4, in the FTA, predetermined information such as information on the availability of the data area is indicated with identification information. For example, identification information "0000h" indicates that a corresponding cluster is "blank". Information "0002h to FFF6h" indicates that a corresponding cluster is "already allocated", and a corresponding value indicate a number of a next cluster. Identification information "FFF7h" indicates that a corresponding cluster is "defective". Identification information "FFF8h to FFFFh" indicate an end of file (EOF) at which a corresponding cluster is "already allocated".

The data area includes a directory area in which information in a file is managed, and a data area in which actual data is written. The directory area includes information on a file name, extension, attribute, latest time of updating, starting-cluster address, file size, etc. of each directory (file) as shown in FIG. 5.

In this embodiment, the system area C to be read first when the composite memory device 1 is energized is set in the nonvolatile recording medium 3 to which instantaneous data access is possible, not in the HDD 10 that takes a predetermined time from the energization of the device 1 until data access is enabled.

Therefore, the recording medium 2 in the HDD 10 has the data area A in which a physical address is assigned to each data having a predetermined size, while the nonvolatile recording medium 3 in the memory unit 11 has the data area B in which a memory address is assigned to each data having a predetermined size and the system area C including the FAT in which logical addresses are associated with the physical addresses in the data area A and memory addresses in the data area B.

Therefore, the system area C can be accessed just after the composite memory device 1 connected to the host device 4 is turned on.

The device recognition unit 13 recognizes whether the host device 4 connected to the interface 12 is a dedicated unit capable of making differentiation between the HDD 10 and memory unit 11 or a general-purpose unit not capable of making differentiation between the HDD 10 and memory unit 11. The device recognition unit 13 supplies the result of recognition to the processing unit 14.

The processing unit 14 includes a CPU making a computation and a RAM (random-access memory) used for provisionally saving data. It reads the FAT from the system area C stored in the nonvolatile recording medium 3, moves a selection pointer in the read FAT correspondingly to the recognition result supplied from the device recognition unit 13, and selects a logical address where predetermined identification information is written. The processing unit 14 supplies the selected logical address to the converter 15.

The converter 15 has an address conversion table on the basis of which the logical address supplied from the processing unit 14 is to be converted into a physical or memory address on the basis of the logical address. When the converted address is a physical address, the converter 15 supplies the physical address to the HDD 10. When the converted address is a memory address, the converter 15 supplies the memory address to the memory unit 11. Also, the converter 15 supplies the result of conversion to the data allocator 16.

Based on the conversion result supplied from the converter 15, the data allocator 16 allocates data supplied from the host device 4 via the interface 12 to the HDD 10 or memory unit 11. For example, in case the data allocator 16 is supplied, from the converter 15, with information that the logical address has been converted into a physical address, it allocates data supplied from the host device 4 via the interface 12 to the HDD 10. On the other hand, in case the data allocator 16 is supplied, from the converter 15, with information that the logical address has been converted into a memory address, it allocates data supplied from the host device 4 via the interface 12 to the memory unit 11.

Figure 6:
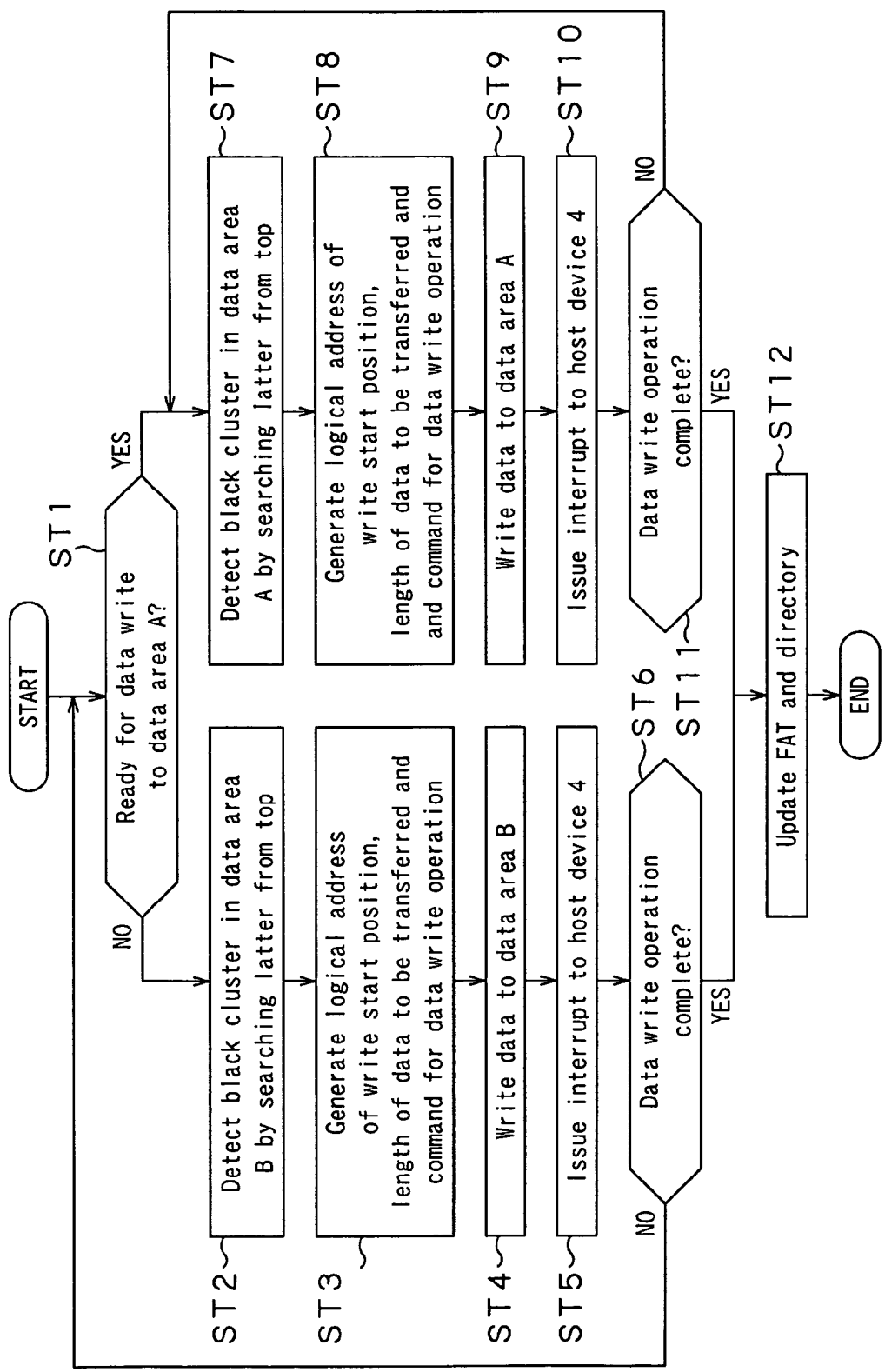
FIG. 6 shows a first flow of operations made for writing data supplied from a host device to the composite memory device.
Figure 7:
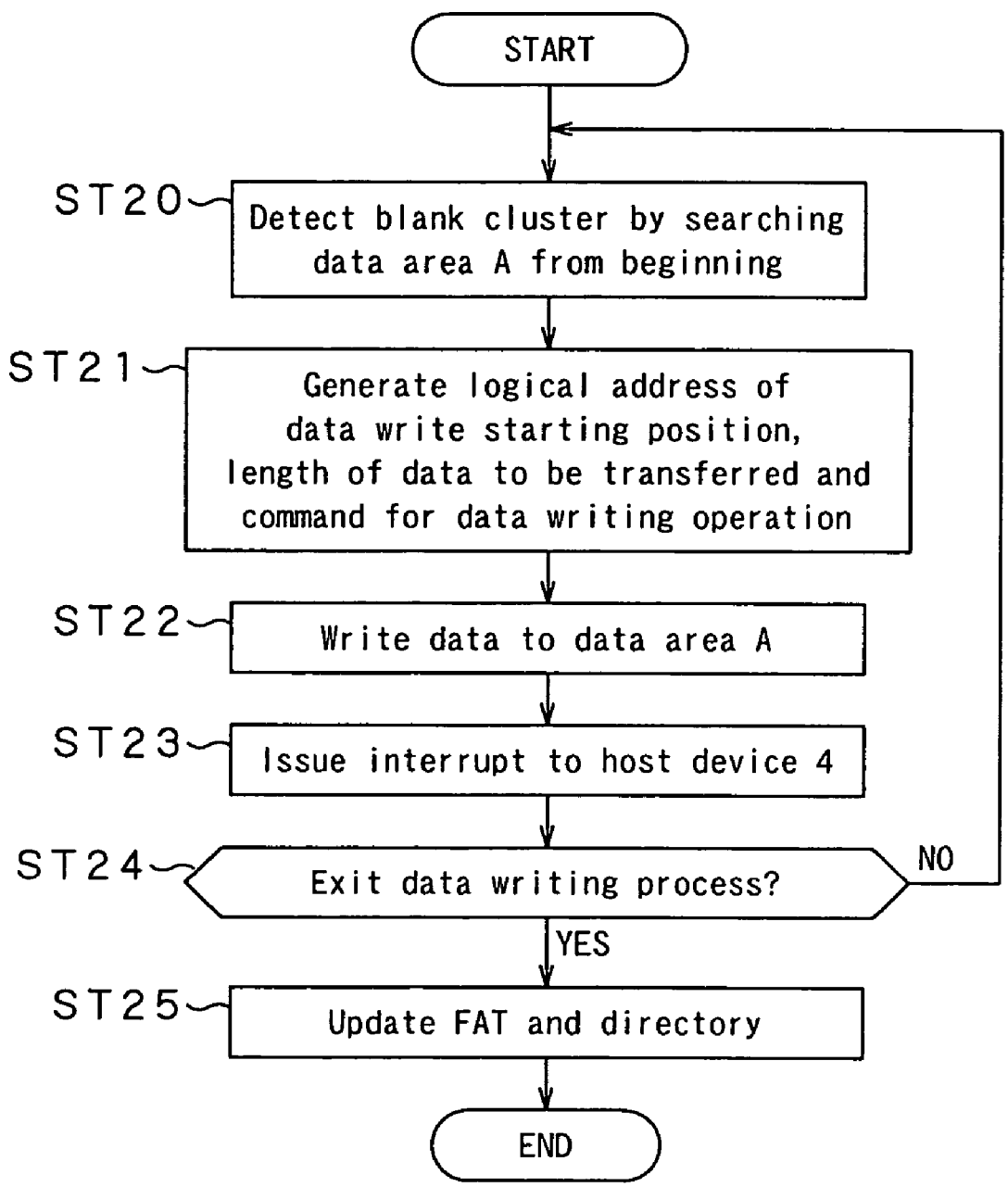
FIG. 7 shows a second flow of operations made for writing data supplied from the host device to the composite memory device.

Here will be explained a first embodiment of the present invention with reference to the flow diagrams shown in FIGS. 6 and 7. It should be noted that as shown in FIG. 8, the composite memory device 1 as the first embodiment includes the recording medium 2 having the data area A assigned physical addresses "0002h" to "7FFFh" and the nonvolatile recording medium 3 having the data area B assigned memory addresses "8000h" to "8FFFh" and system area C including a predetermined FAT.

Also, to handle the data areas A and B integrally with each other, the FAT has assigned thereto logical addresses "0000h" to "7FFFh" corresponding to the data area A and logical addresses "8000h" to "8FFFh" corresponding to the data area B for connection to the data area A. Therefore, in case data is written according to the FAT, when the entire data area A is "already allocated", data will be written to the data area B.

Also, when one sector defined based on a format has a capacity of 512 bytes and 64 such sectors form one cluster, one cluster has a capacity of 64×512 bytes≈32 kB and the data area B in the recording medium 2 has a data capacity of 32 kB×32767≈1 GB. Also, the capacity of the data area B in the nonvolatile recording medium 3 is equivalent to 4096 clusters, namely, 32 kV×4096≈128 MB.

Figure 8:
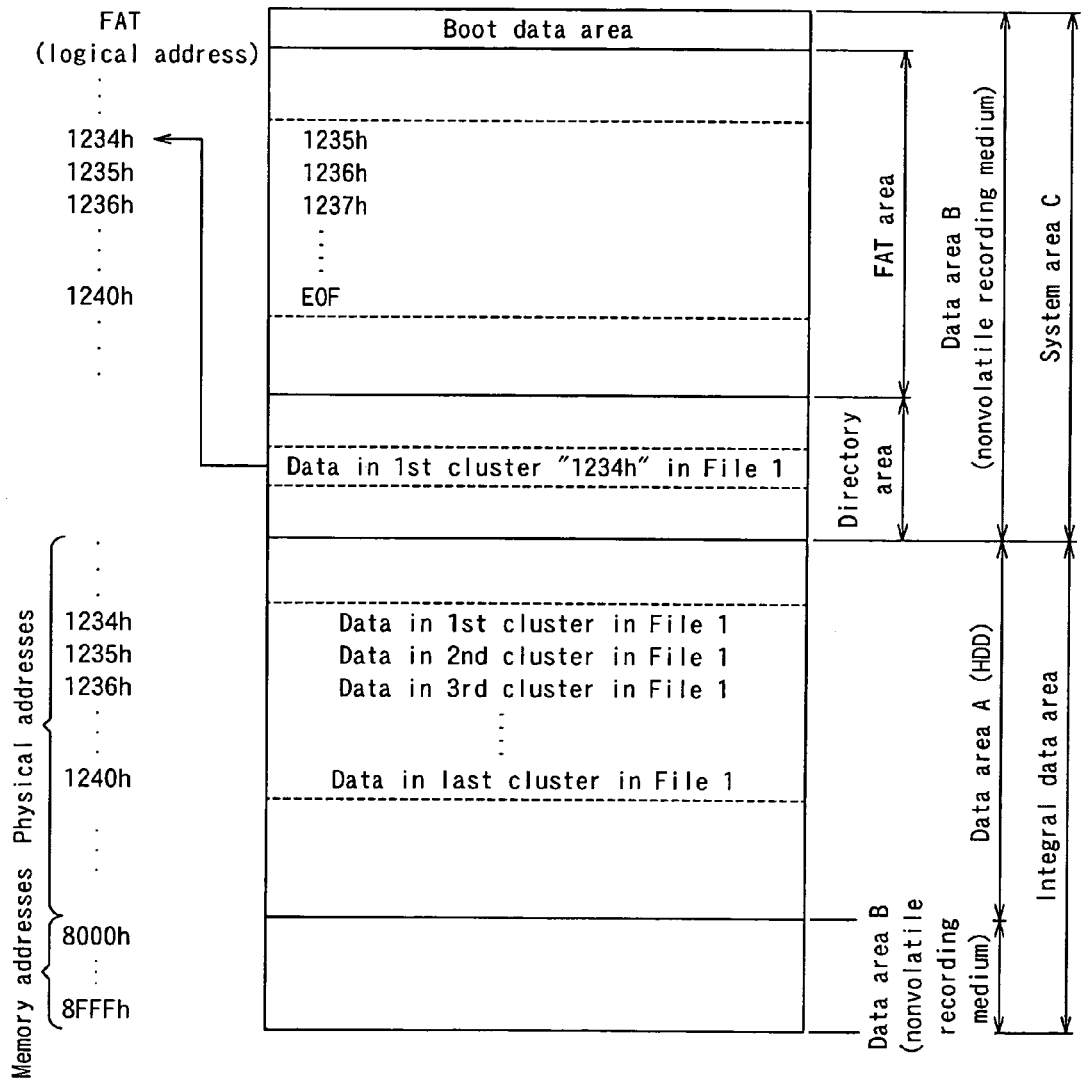
FIG. 8 shows a first configuration of a data area A and data area B.

FIG. 8 also shows how a file (File 1) supplied from the host device 4 is divided by cluster and written to the data area A. When reading such file, data written in the directory area is searched for a file name, data corresponding to a file name "File 1" is read, a logical address indicating the top of a first cluster is extracted from the read data, and data corresponding to the file name "File 1" are sequentially read from the data area B on the basis of the logical address and with reference to the FAT, to thereby read data.

Also, in the composite memory device 1, when the host device 4 is connected to the interface 12, the device recognition unit 13 recognizes which the host device 4 is, a dedicated one or a general-purpose one, and data write is controlled by the processing unit 14 correspondingly to the result of recognition. When a dedicated host device is connected to the interface 12, data is written to the device 1 as in the flow diagram in FIG. 6. On the other hand, when a general-purpose host device is connected to the interface 12, data is written to the device 1 as in the flow diagram in FIG. 7.

Here will be explained data write to the composite memory device 1 having a dedicated host device connected to the interface 12 thereof.

In step ST1, the composite memory device 1 judges whether it gets ready for data write to the data area A. In case the result of judgement is affirmative, the device 1 goes to step ST2. On the contrary, if the result of judgement is negative, the device 1 goes to step ST7.

The recording medium 2 starts being rotated by the drive unit 21 under the control of the servo controller 22 as above.

It takes a few seconds until the rotation of the recording medium 2 reaches a predetermined velocity, namely, until the recording medium 2 gets ready for data. Therefore, the composite memory device 1 controls the data allocator 16 to write data supplied from the dedicated host device to the data area B in the nonvolatile recording medium 3 until the device 1 becomes ready for data write to the data area A. When the device 1 becomes ready for the data write to the data area A, it controls the data allocator 16 to write data supplied from the dedicated host device to the data area A in the recording medium 2.

In step ST2, the composite memory device 1 detects a blank cluster in the data area B by searching the latter from the top. The processing unit 14 reads the FAT from the data area B, and deploys the read FAT in the RAM. The processing unit 14 recognizes, based on the recognition result supplied from the device recognition unit 13, that the host device 4 is a dedicated one, moves the selection pointer to a logical address "8000h" in the FAT deployed in the RAM, and searches logical addresses "8000h" to "8FFFh" for identification information indicative of a blank area with the selection pointer being moved in that direction.

In step ST3, the processing unit 14 generates a logical address of a position for starting data write to the detected blank area, length of data to be transferred and a command for data writing operation, and supplies them to the converter 15.

In step ST4, the composite memory device 1 writes data to a data area corresponding to a predetermined memory address in the data area B. The converter 15 converts the logical address supplied from the processing unit 14 into a memory address on the basis of the address conversion table, and supplies the converted memory address to the memory unit 11. Also, the converter 15 informs the data allocator 16 that it has converted the logical address supplied from the processing unit 14 into the memory address.

In response to the information from the converter 15, the data allocator 16 allocates data supplied via the interface 12 to the memory unit 11. The memory unit 11 will write data supplied from the data allocator 16 to the data area B for the transferred-word length on the basis of the memory address supplied from the converter 15.

In step ST5, the composite memory device 1 issues an interrupt to the host device 4 after writing data for the transferred-data length to the data area B.

In step ST6, the composite memory device 1 judges whether it should exit the data writing process. In case the device 1 has decided to exit the data writing process, it goes to step ST12. On the contrary, if the device 1 has decided to continuously write data, it goes back to step ST1. It should be noted that if the device 1 returns to step ST1 and finds that it is not ready for data write to the data area A, it will repeat the operations in steps ST2 to ST5 above.

In step ST7, the composite memory device 1 searches the data area A from the top thereof for a blank cluster. The processing unit 14 moves the selection pointer to a logical address "0002h" in the FAT deployed in the RAM, and searches logical addresses "0002h" to "8FFFh" for identification information indicative of a blank area with the selection pointer being moved in that direction.

Note that the processing unit 14 may be informed, from a monitor unit (not shown) to monitor the started state of the recording medium 2, that the composite memory device 1 is ready for data write to the data area A and go to step ST7.

In step ST8, the processing unit 14 generates a logical address of a position for starting data write to the detected blank area, length of data to be transferred and a command for writing, and supplies them to the converter 15.

In step ST9, the device 1, the composite memory device 1 writes data to a data area corresponding to a predetermined physical address in the data area A. The converter 15 converts the logical address supplied from the processing unit 14 into a physical address on the basis of the address conversion table, and supplies the converted physical address to the HDD 10. Also, the converter 15 informs the data allocator 16 that it has converted the logical address supplied from the processing unit 14 into the physical address.

In response to the information from the converter 15, the data allocator 16 allocates data supplied via the interface 12 to the HDD 10. The HDD 10 will write data supplied from the data allocator 16 to the data area A for the transferred-word length on the basis of the physical address supplied from the converter 15.

In step ST10, the composite memory device 1 issues an interrupt to the host device 4 after writing data for the transferred-data length to the data area B.

In step ST11, the composite memory device 1 judges whether it should exit the data writing process. In case the device 1 has decided to exit the data writing process, it goes to step ST 12. On the contrary, if the device 1 has decided to continuously write data, it will go back to step ST7 and repeat the operations in steps ST8 to ST11 above.

In step ST12, the composite memory device 1 updates the FAT and directory correspondingly to the new data written to the data area B by going through steps ST2 to ST4 and new data written to the data area A by going through steps ST7 to ST9.

Since data written to the composite memory device 1 will be read in the first-in first-out order, leading data in each file, if any, written to the data area A cannot be read before the recording medium 2 put into rotation reaches a predetermined velocity for data reading. On this account, the device 1 may be adapted to automatically write data supplied from the dedicated host device to the data area B for a predetermined length of time, that is, for a time taken for the recording medium 2 to reach the predetermined velocity, irrespectively of whether the device 1 is ready for data write to the data area A. Owing to this adaptation, the device 1 can read the leading data in each file from the data area B, put the recording medium 2 into rotation while the leading data is being read and thus read data associated with the leading data from the data area A in the recording medium 2 having reached the predetermined velocity. So, data can be reproduced instantaneously without the necessity of setting any wait time for the data reproduction.

Next, the data write to the composite memory device 1 having a general-purpose host device connected to the interface 12 thereof will be explained with reference to the flow diagram in FIG. 7.

In step ST20, the composite memory device 1 detects a blank cluster by searching the data area A from the top of the latter after being ready for data write to the data area A.

The processing unit 14 reads the FAT from the data area B, and deploys the read FAT in the RAM. The processing unit 14 moves the selection pointer to a logical address "0002h" in the FAT deployed in the RAM, and searches logical addresses "0002h" to "8FFFh" for identification information indicative of a blank area with the selection pointer being moved in that direction.

In step ST21, the processing unit 14 generates a logical address of a position for starting data write to the detected blank area, length of data to be transferred and a command for data writing operation, and supplies them to the converter 15.

In step ST22, the composite memory device 1 writes data to a data area corresponding to a predetermined physical address in the data area A. The converter 15 converts the logical address supplied from the processing unit 14 into a physical address on the basis of the address conversion table, and supplies the converted physical address to the HDD 10. Also, the converter 15 informs the data allocator 16 that it has converted the logical address supplied from the processing unit 14 into the physical address.

In response to the information from the converter 15, the data allocator 16 allocates data supplied via the interface 12 to the HDD 10. The HDD 10 will write data supplied from the data allocator 16 to the data area A for the transferred-word length on the basis of the physical address supplied from the converter 15.

In step ST23, the composite memory device 1 issues an interrupt to the host device 4 after writing data for the transferred-data length to the data area A.

In step ST24, the composite memory device 1 judges whether it should exit the data writing process. In case the device 1 has decided to exit the data writing process, it goes to step ST25. On the contrary, if the device 1 has decided to continuously write data, it goes back to step ST20 and repeats the operations in steps ST20 to ST24 above.

In step ST25, the composite memory device 1 updates the FAT and directory correspondingly to the new data written to the data area A.

Note that steps ST1 to ST12 and steps ST20 to ST25 may be programmed and these programs be executed to let the composite memory device 1 to make the aforementioned data write.

Therefore, since the data area B in the nonvolatile recording medium 3 is allocated after the data area A as above, the data write to the data area B from the dedicated host device will not be done before the data area A as a whole is "already allocated".

Since the composite memory device 1 limits the operation of data write to the data area according to the type of the host device 4 as above, even in case data write is made from a general-purpose device, no data write will be made to the data area A before the entire data area B is "already allocated". Therefore, even after data write is made from the general-purpose device, the device 1 as the embodiment of the present invention can write data to the recording medium 2 low in bit cost and nonvolatile recording medium 3 advantageous in quick response, low power consumption, etc. from a dedicated host device with effective utilization of the advantages of these recording media 2 and 3.

Also, with the composite memory device 1 as the embodiment of the present invention, even a general-purpose host device 4 connected to the interface 12 can read data, for reproduction, by tracking information, associated with the data, in the FAT stored in the data area B, it can read data having been written from a dedicated host device and the latter can read data having been written from the general-purpose host device.

Next, a second embodiment of the composite memory device according to the present invention will be illustrated and explained. In the second embodiment, when the host device 4 is a general-purpose one, it is inhibited from writing data to the data area B. On the contrary, when the host device 4 is a dedicated one, it is allowed as usual to write data to the data area B as well.

The composite memory device 1 as the second embodiment includes the recording medium 2 having a data area A assigned physical addresses "0000h" to "7FFFh", nonvolatile recording medium 3 having a data area B assigned memory addresses "8000h" to "8FFFh", and the system area C including first and second FATs.

Figures 9A, 9B:
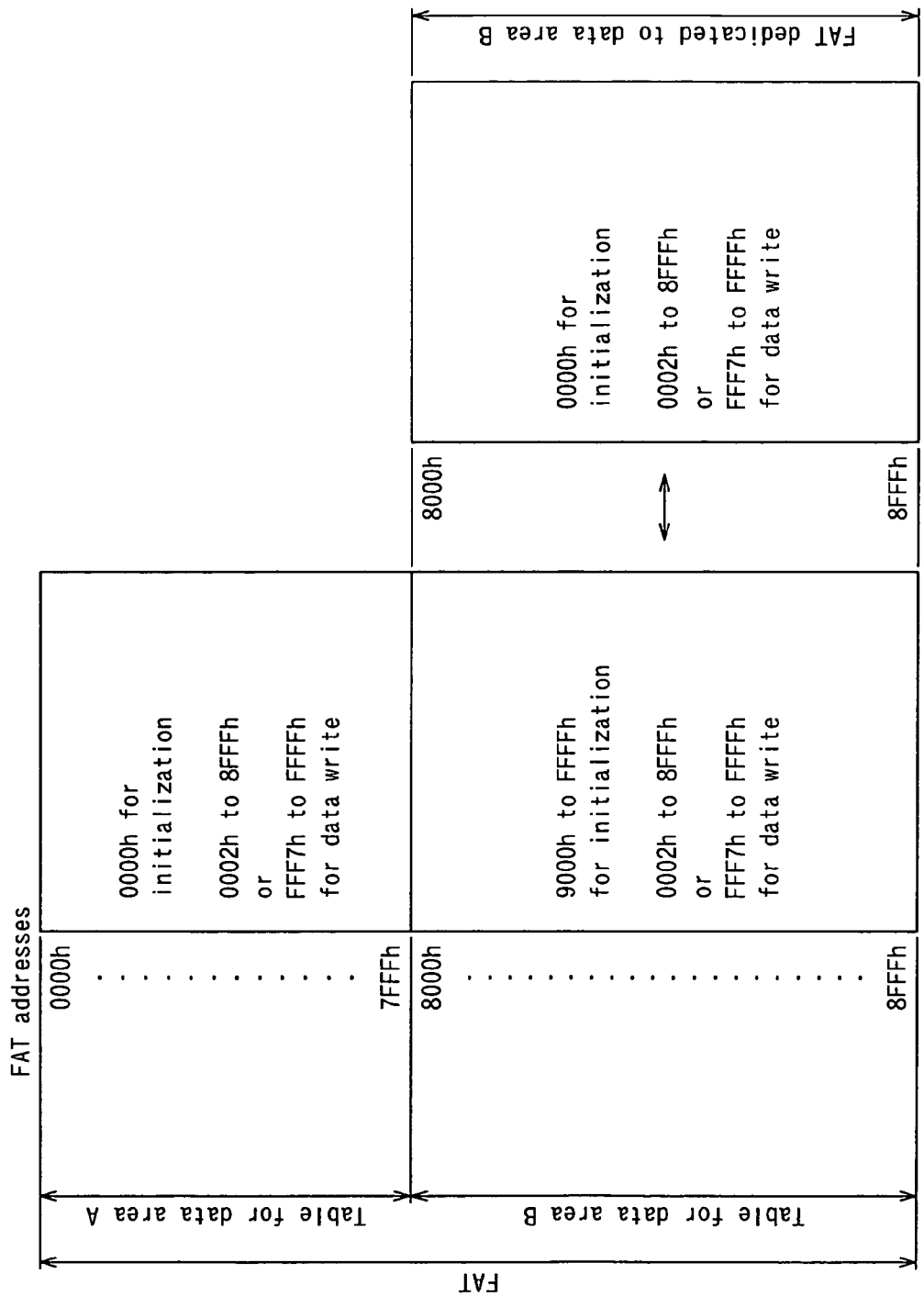
FIG. 9 shows a second configuration of the data area A and data area B.

As shown in FIG. 9A, the first FAT has assigned thereto logical addresses "0000h" to "7FFFh" corresponding to the data area A and logical addresses "8000h" to "8FFFh" corresponding to the data area B at the time of initialization or shipment from the factory, and has written therein, written therein at the time of initialization or shipment from the factory, identification information indicating that it is inhibited to write data at the logical addresses "8000h" to "8FFFh", for example, identification information indicating that data has been written in the data areas, identification information (9000h to FFFFh) indicating that data have been written outside the data areas, identification information (FFF8h to FFFFh) indicating an EOF (end of file) or identification information (FFF7h) indicating that an intended cluster is defective.

As shown in FIG. 9B, the second FAT has assigned thereto addresses "8000h" to "8FFFh" corresponding to the data area B at the time of initialization or shipment from the factory.

Figure 10:
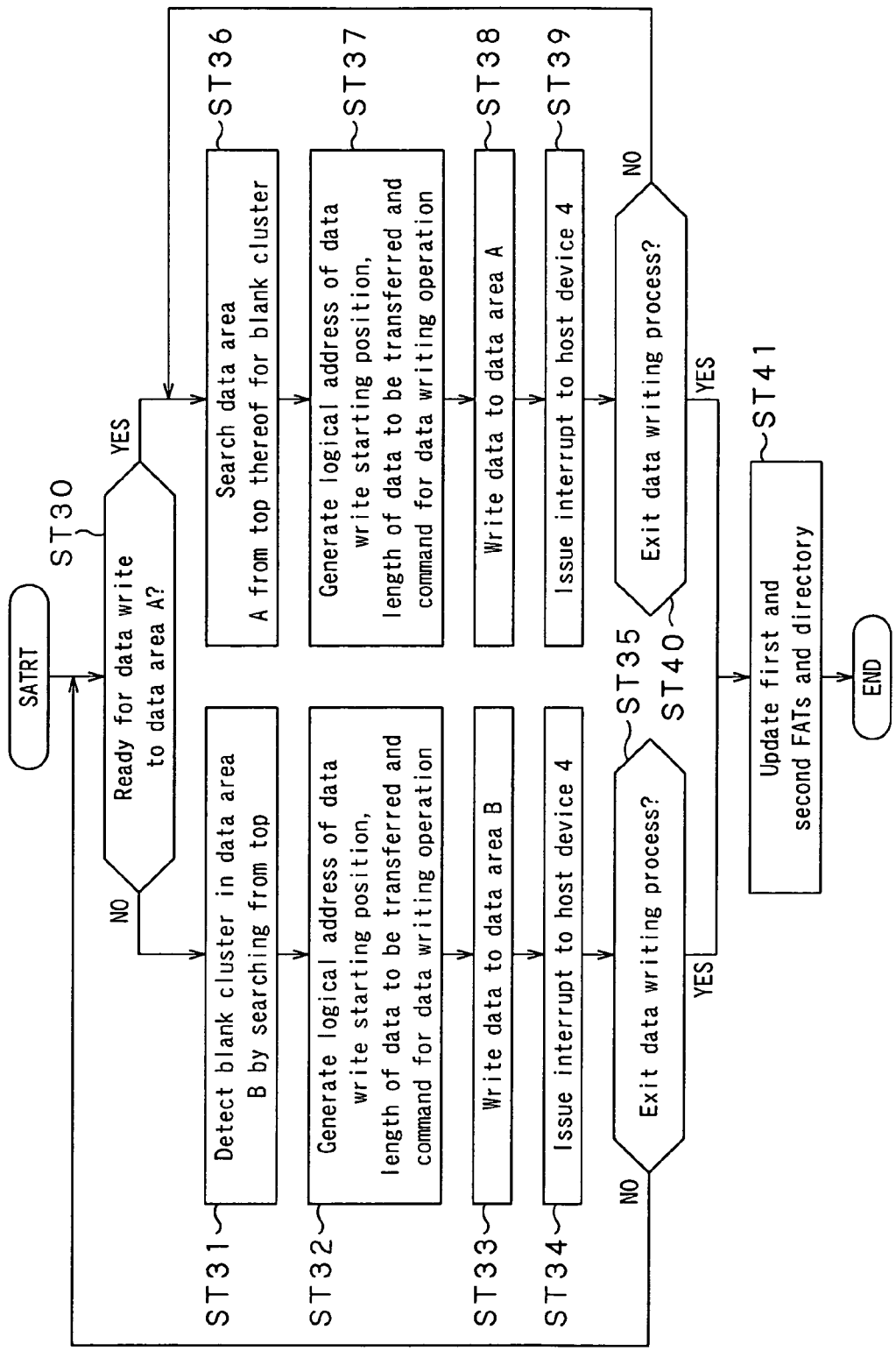
FIG. 10 shows a third flow of operations made for writing data supplied from the host device to the composite memory device.

Here will be explained data write to the composite memory device 1 having a dedicated host device connected to the interface 12 thereof with reference to the flow diagram in FIG. 10.

In step ST30, the composite memory device 1 judges whether it is ready for data write to the data area A. In case the result of judgement is negative, the device 1 goes to step ST31. On the contrary, if the result of judgement is affirmative, the device 1 goes to step ST36.

The recording medium 2 starts being rotated by the drive unit 21 under the control of the servo controller 22. It takes a few seconds until the rotation of the recording medium 2 reaches a predetermined velocity, namely, until the recording medium 2 gets ready for data write. Therefore, the composite memory device 1 controls the data allocator 16 to write data supplied from the dedicated host device to the data area B in the nonvolatile recording medium 3 until the device 1 becomes ready for data write to the data area A. When the device 1 becomes ready for the data write to the data area A, it controls the data allocator 16 to write data supplied from the dedicated host device to the data area A in the recording medium 2.

In step ST31, the composite memory device 1 detects a blank cluster in the data area B by searching the latter from the top. The processing unit 14 reads the first and second FATs from the data area B, and deploys the read first and second FATs in the RAM. The processing unit 14 recognizes, based on the recognition result supplied from the device recognition unit 13, that the host device 4 is a dedicated one, moves the selection pointer to a logical address "8000h" in the second FAT deployed in the RAM, and searches logical addresses "8000h" to "8FFFh" for identification information indicative of a blank area with the selection pointer being moved in that direction.

In step ST32, the processing unit 14 generates a logical address of a position for starting data write to the detected blank area, length of data to be transferred and a command for data writing operation, and supplies them to the converter 15.

In step ST33, the composite memory device 1 writes data to a data area corresponding to a predetermined memory address in the data area B. The converter 15 converts the logical address supplied from the processing unit 14 into a memory address on the basis of the address conversion table, and supplies the converted memory address to the memory unit 11. Also, the converter 15 informs the data allocator 16 that it has converted the logical address supplied from the processing unit 14 into the memory address.

In response to the information from the converter 15, the data allocator 16 allocates data supplied via the interface 12 to the memory unit 11. The memory unit 11 will write data supplied from the data allocator 16 to the data area B for the transferred-word length on the basis of the memory address supplied from the converter 15.

In step ST34, the composite memory device 1 issues an interrupt to the host device 4 after writing data for the transferred-data length to the data area B.

In step ST35, the composite memory device 1 judges whether it should exit the data writing process. In case the device 1 has decided to exit the data writing process, it goes to step ST41. On the contrary, if the device 1 has decided to continuously write data, it goes back to step ST30. It should be noted that if the device 1 returns to step ST30 and finds that it is not ready for data write to the data area A, it will repeat the operations in steps ST31 to ST34 above.

In step ST36, the composite memory device 1 searches the data area A from the top thereof for a blank cluster. The processing unit 14 moves the selection pointer to a logical address "0002h" in the first FAT deployed in the RAM, and searches logical addresses "0002h" to "8FFFh" for identification information indicative of a blank area with the selection pointer being moved in that direction.

Note that the processing unit 14 may be informed, from a monitor unit (not shown) to monitor the started state of the recording medium 2, that the composite memory device 1 is ready for data write to the data area. A and go to step ST36.

In step ST37, the processing unit 14 generates a logical address of a position for starting data write to the detected blank area, length of data to be transferred and a command for data writing operation, and supplies them to the converter 15.

In step ST38, the device 1, the composite memory device 1 writes data to a data area corresponding to a predetermined physical address in the data area A. The converter 15 converts the logical address supplied from the processing unit 14 into a physical address on the basis of the address conversion table, and supplies the converted physical address to the HDD 10. Also, the converter 15 informs the data allocator 16 that it has converted the logical address supplied from the processing unit 14 into the physical address.

In response to the information from the converter 15, the data allocator 16 allocates data supplied via the interface 12 to the HDD 10. The HDD 10 will write data supplied from the data allocator 16 to the data area A for the transferred-word length on the basis of the physical address supplied from the converter 15.

In step ST39, the composite memory device 1 issues an interrupt to the host device 4 after writing data for the transferred-data length to the data area B.

In step ST40, the composite memory device 1 judges whether it should exit the data writing process. In case the device 1 has decided to exit the data writing process, it goes to step ST41. On the contrary, if the device 1 has decided to continuously write data, it will go back to step ST36 and repeat the operations in steps ST37 to ST40 above.

In step ST41, the composite memory device 1 updates the first and second FATs and directory correspondingly to the new data written to the data area B by going through steps ST31 to ST33 and new data written to the data area A by going through steps ST36 to ST38.

Note that at the time of updating the first FAT, the identification information having been written at a logical address corresponding to the data area B at the time of initialization or shipment from the factory to indicate that data write is inhibited is updated with the same identification information (actual identification information) as the new identification information written at the logical address of the second FAT. Therefore, the second FAT is connected to the data area A, and also connected within the data area B. Also, the second FAT is registered as a defective cluster and also as an EOF at the completion of data write.

Since data written to the composite memory device 1 will be read in the first-in first-out order, leading data in each file, if any, written to the data area A cannot be read before the recording medium 2 put into rotation reaches a predetermined velocity for data reading. On this account, the device 1 may be adapted to automatically write data supplied from the dedicated host device to the data area B for a predetermined length of time, that is, for a time taken for the recording medium 2 to reach the predetermined velocity, irrespectively of whether the device 1 is ready for data write to the data area A. Owing to this adaptation, the device 1 can read the leading data in each file from the data area B, put the recording medium 2 into rotation while the leading data is being read and thus read data associated with the leading data from the data area A in the recording medium 2 having reached the predetermined velocity. So, data can be reproduced instantaneously without the necessity of setting any wait time for the data reproduction.

Figure 11:
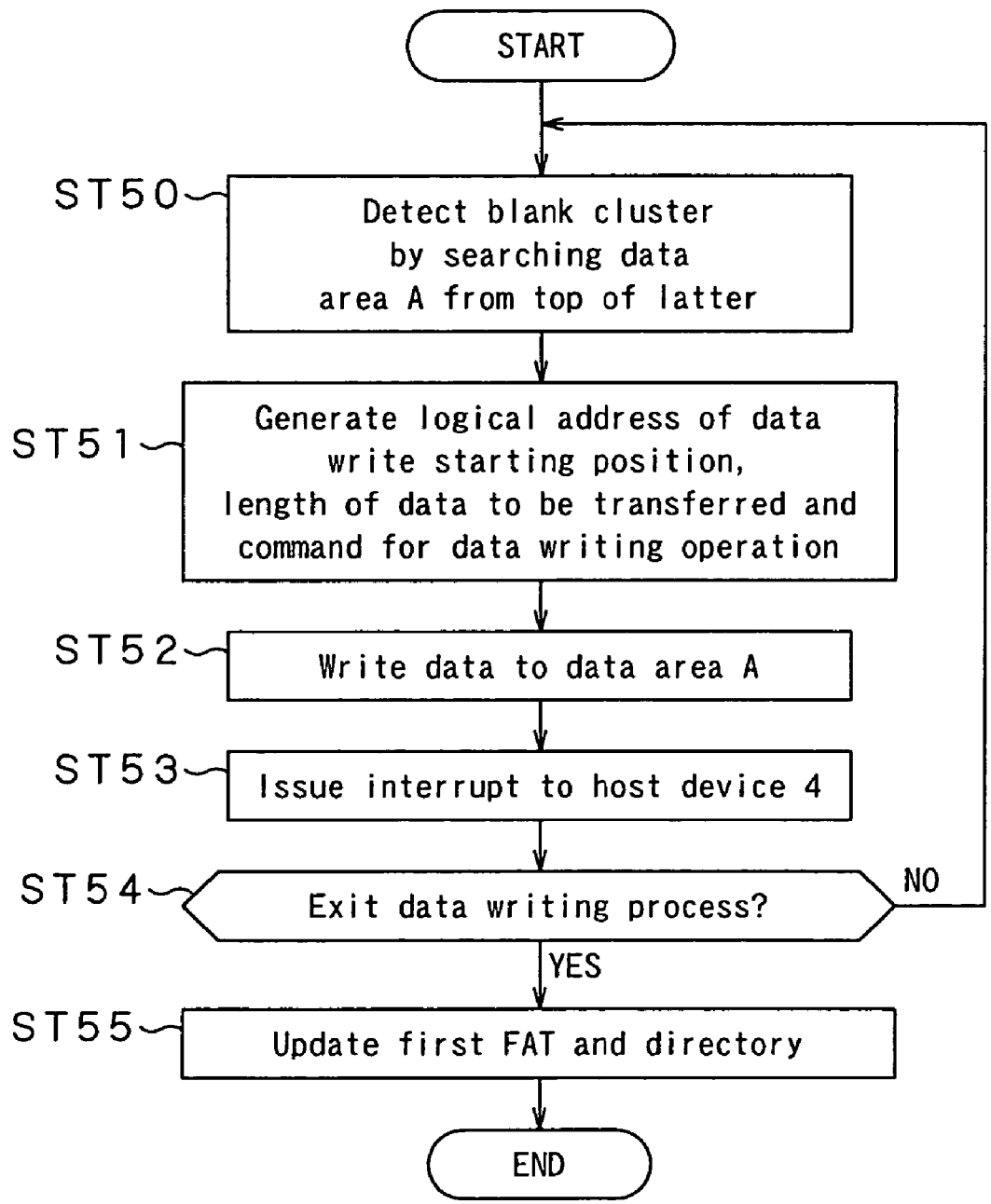
FIG. 11 shows a fourth flow of operations made for writing data supplied from the host device to the composite memory device.

Next, the data write to the composite memory device 1 having a general-purpose host device connected to the interface 12 thereof will be explained with reference to the flow diagram in FIG. 11.

In step ST50, the composite memory device 1 detects a blank cluster by searching the data area A from the top of the latter after being ready for data write to the data area A.

The processing unit 14 reads the first FAT from the data area B, and deploys the read first FAT in the RAM. The processing unit 14 moves the selection pointer to a logical address "0002h" in the first FAT deployed in the RAM, and searches logical addresses "0002h" to "8FFFh" for identification information indicative of a blank area with the selection pointer being moved in that direction. It should be noted that since identification information that data write is inhibited is written at the logical addresses "8000h" to "8FFFh", the processing unit 14 will not be able to write new data in case identification information indicating "already written" is written at the logical addresses "0000h" to "7FFFh".

In step ST51, the processing unit 14 generates a logical address of a position for starting data write to the detected blank area, length of data to be transferred and a command for data writing operation, and supplies them to the converter 15.

In step ST52, the composite memory device 1 writes data to a data area corresponding to a predetermined physical address in the data area A. The converter 15 converts the logical address supplied from the processing unit 14 into a physical address on the basis of the address conversion table, and supplies the converted physical address to the HDD 10. Also, the converter 15 informs the data allocator 16 that it has converted the logical address supplied from the processing unit 14 into the physical address.

In response to the information from the converter 15, the data allocator 16 allocates data supplied via the interface 12 to the HDD 10. The HDD 10 will write data supplied from the data allocator 16 to the data area A for the transferred-word length on the basis of the physical address supplied from the converter 15.

In step ST53, the composite memory device 1 issues an interrupt to the host device 4 after writing data for the transferred-data length to the data area A.

In step ST54, the composite memory device 1 judges whether it should exit the data writing process. In case the device 1 has decided to exit the data writing process, it goes to step ST55. On the contrary, if the device 1 has decided to continuously write data, it goes back to step ST50 and repeats the operations in steps ST50 to ST54 above.

In step ST55, the composite memory device 1 updates the first FAT and directory correspondingly to the new data written to the data area A.

Note that steps ST30 to ST41 and steps ST50 to ST55 may be programmed and these programs be executed to let the composite memory device 1 to make the aforementioned data write.

Since the composite memory device 1 limits the operation of data write to the data area according to the type of the host device 4 as above, in case data write is made from a general-purpose device, no data write will be made to the data area A because data write to the entire data area B is inhibited. Therefore, even after data write is made from the general-purpose device, the device 1 as the embodiment of the present invention can write data to the recording medium 2 low in bit cost and nonvolatile recording medium 3 advantageous in quick response, low power consumption, etc. from a dedicated host device with effective utilization of the advantages of these recording media 2 and 3.

Also, with the composite memory device 1 as the embodiment of the present invention, even a general-purpose host device 4 connected to the interface 12 can read data, for reproduction, by tracking information, associated with the data, in the first FAT stored in the data area B, it can read data having been written from a dedicated host device and the latter can read data having been written from the general-purpose host device.

Next, a third embodiment of the composite memory device according to the present invention will be illustrated and explained.

In this third embodiment, when a general-purpose host device 4 is to write data to the composite memory device as the third embodiment, it is inhibited from writing data to the data area B, while a dedicated host device 4 is allowed as usual to write data to the data area B as well. It should be noted that in the third embodiment, the data area B is used for provisionally saving data supplied from a dedicated host device.

The composite memory device 1 as the third embodiment includes the recording medium 2 having a data area A assigned predetermined physical addresses and nonvolatile recording medium 3 having a data area B assigned predetermined memory addresses and the system area C including third and fourth FATs.

The third FAT has assigned thereto predetermined logical addresses corresponding to the data area A as shown in FIG. 12A, and the fourth FAT has assigned thereto predetermined logical addresses corresponding to the data area B as shown in FIG. 12B.

Figure 13:
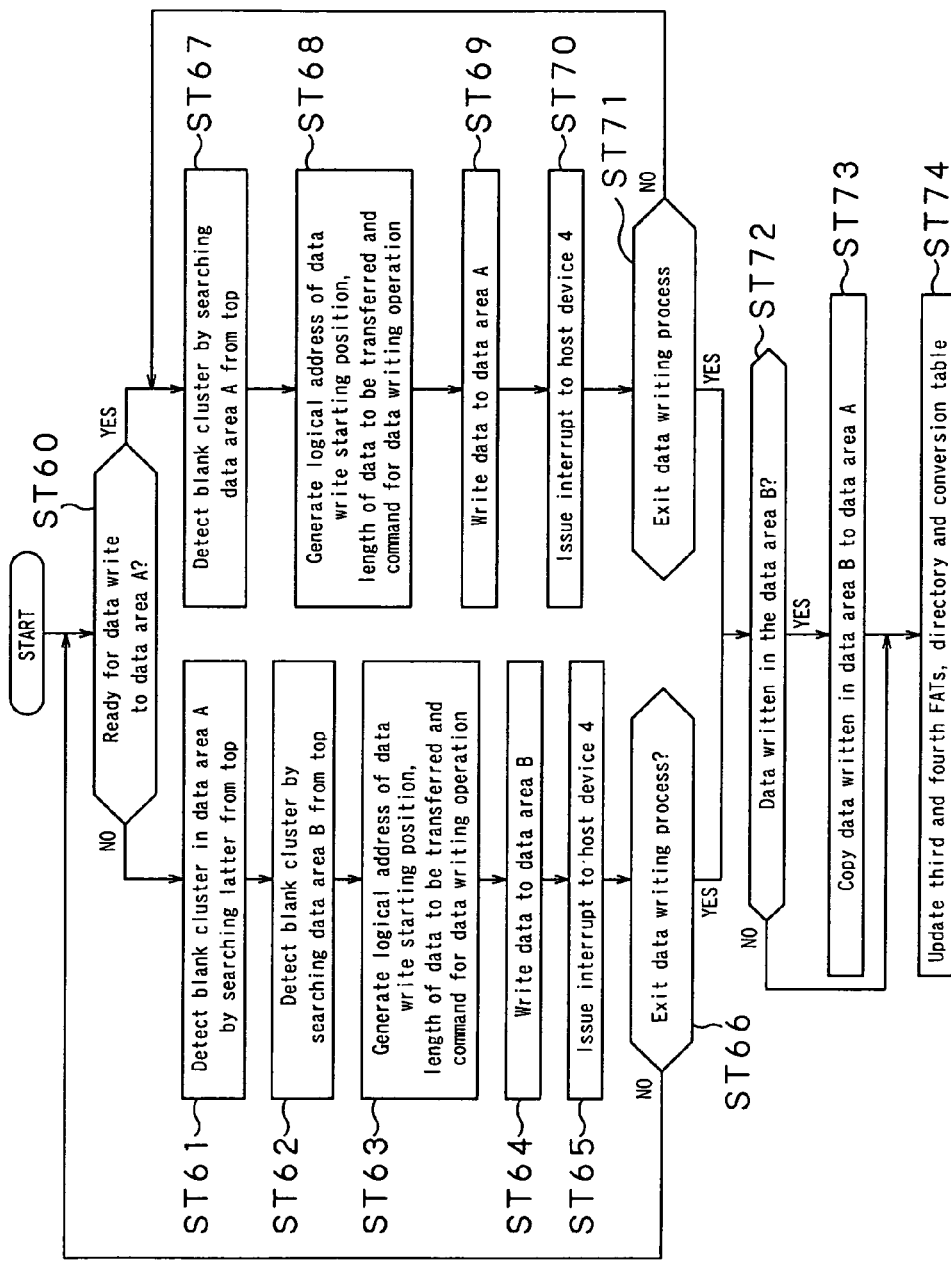
FIG. 13 shows a fifth flow of operations made for writing data supplied from the host device to the composite memory device.

Here will be explained data write to the composite memory device 1 having a dedicated host device connected to the interface 12 thereof with reference to the flow diagram in FIG. 13.

In step ST60, the composite memory device 1 judges whether it is ready for data write to the data area A. In case the result of judgement is negative, the device 1 goes to step ST61. On the contrary, if the result of judgement is affirmative, the device 1 goes to step ST67.

The recording medium 2 starts being rotated by the drive unit 21 under the control of the servo controller 22. It takes a few seconds until the rotation of the recording medium 2 reaches a predetermined velocity, namely, until the recording medium 2 gets ready for data write. Therefore, the composite memory device 1 controls the data allocator 16 to write data supplied from the dedicated host device to the data area B in the nonvolatile recording medium 3 until the device 1 becomes ready for data write to the data area A. When the device 1 becomes ready for the data write to the data area A, it controls the data allocator 16 to write data supplied from the dedicated host device to the data area A in the recording medium 2.

In step ST61, the composite memory device 1 detects a blank cluster in the data area A by searching the latter from the top. The processing unit 14 reads the third FAT from the data area B, and deploys the read third FAT in the RAM. The processing unit 14 moves the selection pointer to a predetermined logical address in the second FAT deployed in the RAM, and searches logical addresses including from the predetermined one to the end one for identification information indicative of a blank area with the selection pointer being moved in that direction.

In step ST62, the composite memory device 1 detects a blank cluster by searching the data area B from the top of the latter. Further, the processing unit 14 reads the fourth FAT from the data area B and deploys the read fourth FAT in the RAM. The processing unit 14 recognizes, based on the result of recognition supplied from the device recognition unit 13, that the host device 4 is a dedicated one, moves the selection pointer to predetermined logical addresses of the third and fourth FATs deployed in the RAM and searches logical addresses including from the predetermined one to the end one for identification information indicative of a blank area with the selection pointer being moved in that direction. The processing unit 14 generates a conversion table in which a logical address indicating a blank area in the third FAT is associated with a logical address indicating a blank area in the fourth FAT. The generated conversion table is stored into a predetermined area in the data area B.

In step ST63, the processing unit 14 generates a logical address of a position for starting data write to the blank area detected in the fourth FAT, length of data to be transferred and a command for data writing operation, and supplies them to the converter 15.

In step ST64, the composite memory device 1 writes data to a data area corresponding to a predetermined memory address in the data area B. The converter 15 converts the logical address supplied from the processing unit 14 into a memory address on the basis of the address conversion table, and supplies the converted memory address to the memory unit 11. Also, the converter 15 informs the data allocator 16 that it has converted the logical address supplied from the processing unit 14 into the memory address.

In response to the information from the converter 15, the data allocator 16 allocates data supplied via the interface 12 to the memory unit 11. The memory unit 11 will write data supplied from the data allocator 16 to the data area B for the transferred-word length on the basis of the memory address supplied from the converter 15.

In step ST65, the composite memory device 1 issues an interrupt to the host device 4 after writing data for the transferred-data length to the data area B.

In step ST66, the composite memory device 1 judges whether it should exit the data writing process. In case the device 1 has decided to exit the data writing process, it goes to step ST72. On the contrary, if the device 1 has decided to continuously write data, it goes back to step ST60. It should be noted that if the device 1 returns to step ST60 and finds that it is not ready for data write to the data area A, it will repeat the operations in steps ST61 to ST65 above.

In step ST67, the composite memory device 1 detects a blank cluster by searching the data area A from the top thereof. The processing unit 14 moves the selection pointer to a predetermined logical address in the third FAT deployed in the RAM, and searches logical addresses including from the predetermined one to the end one for identification information indicative of a blank area with the selection pointer being moved in that direction.

Note that the processing unit 14 may be informed, from a monitor unit (not shown) to monitor the started state of the recording medium 2, that the composite memory device 1 is ready for data write to the data area A and go to step ST67.

In step ST68, the processing unit 14 generates a logical address of a position for starting data write to the detected blank area, length of data to be transferred and a command for data writing operation, and supplies them to the converter 15.

In step ST69, the device 1, the composite memory device 1 writes data to a data area corresponding to a predetermined physical address in the data area A. The converter 15 converts the logical address supplied from the processing unit 14 into a physical address on the basis of the address conversion table, and supplies the converted physical address to the HDD 10. Also, the converter 15 informs the data allocator 16 that it has converted the logical address supplied from the processing unit 14 into the physical address.

In response to the information from the converter 15, the data allocator 16 allocates data supplied via the interface 12 to the HDD 10. The HDD 10 will write data supplied from the data allocator 16 to the data area A for the transferred-word length on the basis of the physical address supplied from the converter 15.

In step ST70, the composite memory device 1 issues an interrupt to the host device 4 after writing data for the transferred-data length to the data area B.

In step ST71, the composite memory device 1 judges whether it should exit the data writing process. In case the device 1 has decided to exit the data writing process, it goes to step ST72. On the contrary, if the device 1 has decided to continuously write data, it will go back to step ST67 and repeat the operations in steps ST68 to ST71 above.

In step ST72, the composite memory device 1 judges, based on the conversion table generated in step ST62, for example, whether data has been written in the data area B. In case data is found written in the data area B, the device 1 goes to step ST73. On the contrary, in case no data is found written in the data area B, the device 1 goes to step ST74.

In step ST73, the composite memory device 1 copies data written in the data area B by going through steps ST61 to ST63 to the data area A. For example, in case data is written at memory addresses "XX0021h" to "XX0024h" in the data area B as shown in FIG. 12, the device 1 reads data written at the "XX0021h" to "XX0024h", and copies the read data to predetermined physical addresses "1234h" to "1237h" in the data area A with reference to the conversion table generated in step ST62.

In step ST74, the composite memory device 1 updates the third and fourth FATs, directory and the conversion table generated in step ST62 correspondingly to the new data written to the data area B by going through steps ST61 to ST63 and new data written to the data area A by going through steps ST66 to ST68.

Figure 14:
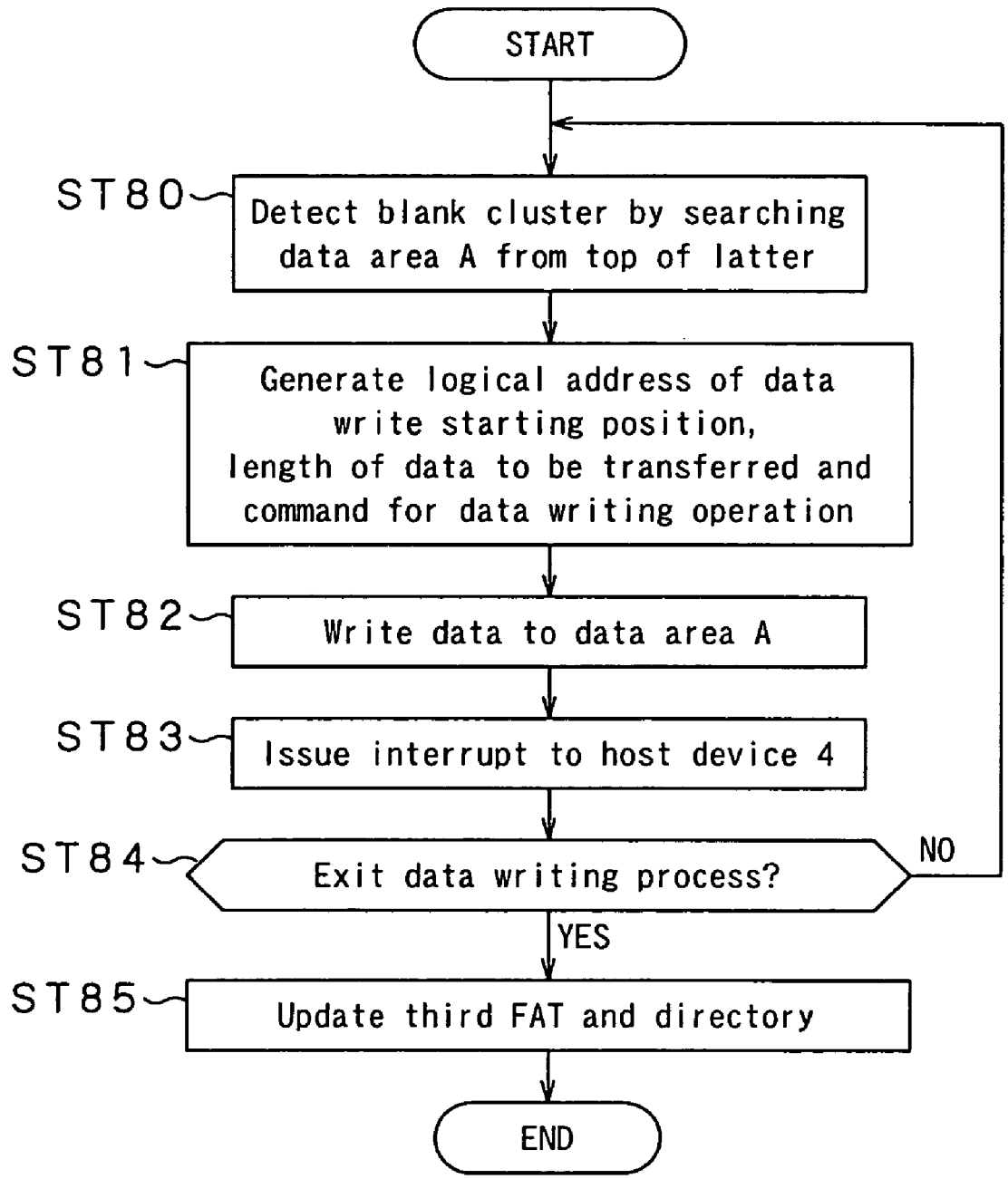
FIG. 14 shows a sixth flow of operations made for writing data supplied from the host device to the composite memory device.

Next, the data write to the composite memory device 1 having a general-purpose host device connected to the interface 12 thereof will be explained with reference to the flow diagram in FIG. 14.

In step ST80, the composite memory device 1 detects a blank cluster by searching the data area A from the top of the latter after being ready for data write to the data area A.

The processing unit 14 reads the third FAT from the data area B, and deploys the read third FAT in the RAM. The processing unit 14 moves the selection pointer to a predetermined logical address in the third FAT deployed in the RAM, and searches logical addresses including from the predetermined one to the end one for identification information indicative of a blank area with the selection pointer being moved in that direction.

In step ST81, the processing unit 14 generates a logical address of a position for starting data write to the detected blank area, length of data to be transferred and a command for data writing operation, and supplies them to the converter 15.

In step ST82, the composite memory device 1 writes data to a data area corresponding to a predetermined physical address in the data area A. The converter 15 converts the logical address supplied from the processing unit 14 into a physical address on the basis of the address conversion table, and supplies the converted physical address to the HDD 10. Also, the converter 15 informs the data allocator 16 that it has converted the logical address supplied from the processing unit 14 into the physical address.

In response to the information from the converter 15, the data allocator 16 allocates data supplied via the interface 12 to the HDD 10. The HDD 10 will write data supplied from the data allocator 16 to the data area A for the transferred-word length on the basis of the physical address supplied from the converter 15.

In step ST83, the composite memory device 1 issues an interrupt to the host device 4 after writing data for the transferred-data length to the data area A.

In step ST84, the composite memory device 1 judges whether it should exit the data writing process. In case the device 1 has decided to exit the data writing process, it goes to step ST85. On the contrary, if the device 1 has decided to continuously write data, it goes back to step ST80 and repeats the operations in steps ST80 to ST84 above.

In step ST85, the composite memory device 1 updates the third FAT and directory correspondingly to the new data written to the data area A.

Note that steps ST60 to ST74 and steps ST80 to ST85 may be programmed and these programs be executed to let the composite memory device 1 to make the aforementioned data write.

As having been described in the foregoing, the composite memory device 1 as the embodiment of the present invention is open to an external device. It has the third FAT to manage the data area A and fourth FAT used only in the recording medium to manage the data area B. It limits data write to the data area depending upon the type of a host device 4 connected to the device 1 and copies data written in the data area B to the data area A after completion of the data write, so that a general-purpose host device will not male any data write and read to and from the data area B. Therefore, even after data write is made from the general-purpose device, the device 1 can write data to the recording medium 2 low in bit cost and nonvolatile recording medium 3 advantageous in quick response, low power consumption, etc. from a dedicated host device with effective utilization of the advantages of these recording media 2 and 3.

Also, in the composite memory device 1 as the embodiment of the present invention, since data for reproduction should be read from the data area A, a general-purpose host device 4 can read data having been written from a dedicated host device and the dedicated host device can read data having been written from the general-purpose host device.

The first to third embodiments have been described in the foregoing each as an example capable of recording a moving picture instantaneously. However, the first embodiment of the device 1 having the recording medium 2 low in bit cost and nonvolatile recording medium 3 advantageous in quick response, low power consumption, etc. may be adapted otherwise. Namely, when the recording medium 2 is driven up to a predetermined velocity or when it is in waiting state, the device 1 consumes the power, which will adversely affect the power availability in an HDD based mobile device which uses a limited source of energy. Further, if any of the clusters on the track of the hard disk becomes defective, the data transfer rate will be deteriorated because a normal cluster has to be substituted for the defective one. To avoid this, the device may be adapted to always write a file which is accessed frequently or a small-capacity file to the nonvolatile recording medium 3, whereby the power consumption can be reduced and the power source can be made for a longer time.

Also, the composite memory device 1 according to the present invention may be adapted so that the FATs are managed within the recording medium 2, whereby the host device 4 will advantageously be less loaded and count out FATs increased in number correspondingly to an increased capacity of the data areas A and B.

Note that in case the host device 4 has the same function as those of the device recognition unit 13, processing unit 14 and converter 15, the composite memory device 1 may be adapted for the host device 4 to perform the functions of the device recognition unit 13, processing unit 14 and converter 15.

Also, although the embodiments of the present invention have been described above on the assumption that the recording medium 2 is a hard disk, the recording medium 2 may be a CD or DVD because a random-accessible recording medium will be able to function as having been described in the foregoing.

Also, although the FAT file system is used to manage the data areas in the composite memory device 1, any system capable of managing data as a file may be used in place of the FAT file system.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A composite memory device comprising:
    a recording medium having a first data area assigned a first physical address;
    a nonvolatile recording medium having a second data area assigned a second physical address, and an identification information table assigned logical addresses for managing the first and second physical addresses and having predetermined identification information written therein at each of the logical addresses;
    an interface to which a host device is to be connected;
    a recognizing means for recognizing a host device connected to the interface;
    an identification information table reading means for reading the identification information table from the nonvolatile recording medium;
    an information selecting means for selecting a logical address where the predetermined identification information is written on the basis of the result of recognition supplied from the recognizing means and identification information table read by the identification information table reading means;
    a converting means for converting a logical address selected by the identification information selecting means into a first predetermined physical address corresponding to the first data area and into a second predetermined physical address corresponding to the second data area;

a data allocating means for allocating data supplied from the host device connected to the interface to the first or second data area on the basis of the conversion made by the converting means;

a first writing means for writing the data allocated to the first data area by the data allocating means at a predetermined location in the first data area on the basis of the first physical address; and a second writing means for writing the data allocated to the second data area by the data allocating means on the basis of the second physical address.

2. The composite memory device according to claim 1, wherein:

when informed from the recognizing means that the host device connected to the interface is not able to make differentiation between the recording medium and nonvolatile recording medium, the information selecting means preferentially selects one where identification information indicative of a blank area is written from among logical addresses corresponding to the first data area in an identification information table read by the identification information table reading means; and when informed from the recognizing means that the host device connected to the interface is able to make differentiation between the recording medium and nonvolatile recording medium, the information selecting means preferentially selects one where identification information indicative of a blank area is written from among logical addresses corresponding to, the second data area in the identification information table read by the identification information table reading means.

3. A method of writing data to a composite memory device including a recording medium having a first data area assigned a first physical address, a nonvolatile recording medium having a second data area assigned a second physical address, and an identification information table assigned logical addresses for managing the first and second physical addresses and having predetermined identification information written therein at each of the logical addresses, and an interface to which a host device is to be connected, the method comprising:

a recognizing step of recognizing a host device connected to the interface;

an identification information table reading step of reading the identification information table from the nonvolatile recording medium;

an information selecting step of selecting a logical address where the predetermined identification information is written on the basis of the result of recognition supplied from the recognizing step and identification information table read in the identification information table reading step;

a converting step of converting a logical address selected in the identification information selecting step into a first predetermined physical address corresponding to the first data area and into a second predetermined physical address corresponding to the second data area;

a data allocating step of allocating data supplied from the host device connected to the interface to the first or second data area on the basis of the conversion made in the converting step;

a first writing step of writing the data allocated to the first data area in the data allocating step at a predetermined location in the first data area on the basis of the first physical address; and a second writing step of writing the data allocated to the second data area in the data allocating step on the basis of the second physical address.

4. A program for having a computer write data to a composite memory device including a recording medium having a first data area assigned a first physical address, a nonvolatile recording medium having a second data area assigned a second physical address, and an identification information table assigned logical addresses for managing the first and second physical addresses and having predetermined identification information written therein at each of the logical addresses, and an interface to which a host device is to be connected, the program comprising:

a recognizing step of recognizing a host device connected to the interface;

an identification information table reading step of reading the identification information table from the nonvolatile recording medium;

an information selecting step of selecting a logical address where the predetermined identification information is written on the basis of the result of recognition supplied from the recognizing step and identification information table read in the identification information table reading step;

a converting step of converting a logical address selected in the identification information selecting step into a first predetermined physical address corresponding to the first data area and into a second predetermined physical address corresponding to the second data area;

a data allocating step of allocating data supplied from the host device connected to the interface to the first or second data area on the basis of the conversion made in the converting step;

a first writing step of writing the data allocated to the first data area in the data allocating step at a predetermined location in the first data area on the basis of the first physical address; and a second writing step of writing the data allocated to the second data area in the data allocating step on the basis of the second physical address.

5. A composite memory device comprising:

a recording medium having a first data area assigned a first physical address;

a nonvolatile recording medium having a second data area assigned a second physical address, and a first identification information table assigned logical addresses for managing the first and second physical addresses and having written therein identification information that data write at the physical addresses is refused and a second identification information table assigned logical addresses corresponding to the second physical address and having predetermined identification is written at each of the logical addresses;

an interface to which a host device is to be connected;

a recognizing means for recognizing a host device connected to the interface;

an identification information table reading means for reading the first identification information table or the first and second identification information tables from the nonvolatile recording medium on the basis of the result of recognition supplied from the recognizing means;

an information selecting means for selecting a logical address where the predetermined identification information is written on the basis of the first identification information table or the first and second identification information tables read by the identification information table reading means;

a converting means for converting a logical address selected by the identification information selecting means into a first predetermined physical address corresponding to the first data area and into a second predetermined physical address corresponding to the second data area;

a data allocating means for allocating data supplied from the host device connected to the interface to the first or second data area on the basis of the conversion made by the converting means;

a first writing means for writing the data allocated to the first data area by the data allocating means at a predetermined location in the first data area on the basis of the first physical address; and a second writing means for writing the data allocated to the second data area by the data allocating means on the basis of the second physical address.

6. The composite memory device according to claim 5, wherein:

when informed from the recognizing means that the host device connected to the interface is not able to make differentiation between the recording medium and nonvolatile recording medium, the identification information table reading means selects the first identification information table from the nonvolatile recording medium; and when informed from the recognizing means that the host device connected to the interface is able to make differentiation between the recording medium and nonvolatile recording medium, the identification information table reading means selects the first and second identification information tables from the nonvolatile recording medium, and when the identification information table reading means has read the first identification information table, the information selecting means selects a logical address where identification information indicative of a blank area is written from the first identification information table read by the identification information table reading means;

when the identification information table reading means has read the first and second identification information tables, the information selecting means preferentially selects a logical address where identification information indicative of a blank area is written from the second identification information table; and when there is no blank area in the second identification information table, the information selecting means selects a logical address where identification information indicative of a blank area is written from the first identification information table.

7. The composite memory device according to claim 5, wherein the identification information that it is refused to write data written in the first identification information table is refused is pseudo identification information indicating that data is already written in the second data area, pseudo identification information indicating that the second data area is a defective cluster, pseudo identification information indicating that the second data area is outside the data area or pseudo identification information indicating an EOF (end of file).

8. A method of writing data to a composite memory device including a recording medium having a first data area assigned a first physical address, a nonvolatile recording medium having a second data area assigned a second physical address, and a first identification information table assigned logical addresses for managing the first and second physical addresses and having written therein identification information that data write at the physical addresses is refused and a second identification information table assigned logical addresses corresponding to the second physical address and having predetermined identification is written at each of the logical addresses, and an interface to which a host device is to be connected, the method comprising:

a recognizing step of recognizing a host device connected to the interface;

an identification information table reading step of reading the first identification information table or the first and second identification information tables from the nonvolatile recording medium on the basis of the result of recognition supplied from the recognizing means;

an information selecting step of selecting a logical address where the predetermined identification information is written on the basis of the first identification information table or the first and second identification information tables read in the identification information table reading step;

a converting step of converting a logical address selected in the identification information selecting step into a first predetermined physical address corresponding to the first data area and into a second predetermined physical address corresponding to the second data area;

a data allocating step of allocating data supplied from the host device connected to the interface to the first or second data area on the basis of the conversion made in the converting means;

a first writing step of writing the data allocated to the first data area in the data allocating means at a predetermined location in the first data area on the basis of the first physical address; and a second writing step of writing the data allocated to the second data area in the data allocating step on the basis of the second physical address.

9. A program for having a computer write data to a composite memory device including a recording medium having a first data area assigned a first physical address, a nonvolatile recording medium having a second data area assigned a second physical address, and a first identification information table assigned logical addresses for managing the first and second physical addresses and having written therein identification information that data write at the physical addresses is refused and a second identification information table assigned logical addresses corresponding to the second physical address and having predetermined identification is written at each of the logical addresses, and an interface to which a host device is to be connected, the program comprising:

a recognizing step of recognizing a host device connected to the interface;

an identification information table reading step of reading the first identification information table or the first and second identification information tables from the nonvolatile recording medium on the basis of the result of recognition supplied from the recognizing means;

an information selecting step of selecting a logical address where the predetermined identification information is written on the basis of the first identification information table or the first and second identification information tables read in the identification information table reading step;

a converting step of converting a logical address selected in the identification information selecting step into a first predetermined physical address corresponding to the first data area and into a second predetermined physical address corresponding to the second data area;

a data allocating step of allocating data supplied from the host device connected to the interface to the first or second data area on the basis of the conversion made in the converting means;

a first writing step of writing the data allocated to the first data area in the data allocating means at a predetermined location in the first data area on the basis of the first physical address; and a second writing step of writing the data allocated to the second data area in the data allocating step on the basis of the second physical address.

10. A composite memory device comprising:

a recording medium having a first data area assigned a first physical address;

a nonvolatile recording medium having a second data area assigned a second physical address, a first identification information table assigned a second data area assigned a second physical address and having predetermined identification information written at the first logical address and a second identification information table assigned a second logical address corresponding to the second physical address and having predetermined identification information written at the second logical address;

an interface to which a host device is to be connected;

a recognizing means for recognizing a host device connected to the interface;

an identification information table reading means for reading the first and second identification information tables from the nonvolatile recording medium on the basis of the result of recognition supplied from the recognizing means;

a first information selecting means for selecting the first logical address where the predetermined identification information is written from the first identification information table read by the identification information table reading means;

a second information selecting means for selecting the second logical address where the predetermined identification information is written from the second identification information table read by the identification information table reading means on the basis of the result of recognition supplied from the recognizing means;

a conversion table generating means for generating a conversion table in which the first logical address selected by the first information selecting means and second logical address selected by the second information selecting means are associated with each other;

a converting means for converting the first logical address selected by the first identification information selecting means into a first predetermined physical address corresponding to the first data area and the second logical address selected by the second information selecting means into a second predetermined physical address corresponding to the second data area;

a data allocating means for allocating data supplied from the host device connected to the interface to the first or second data area on the basis of the conversion made by the converting means;

a first writing means for writing the data allocated to the first data area by the data allocating means at a predetermined location in the first data area on the basis of the first physical address converted by the converting means;

a second writing means for writing the data allocated to the second data area by the data allocating means at a predetermined location in the second data area on the basis of the second physical address converted by the converting means; and a third writing means for writing data written in the second data area by the second writing means at a predetermined location in the first data area on the basis of the conversion table generated by the conversion table generating means.

11. The composite memory device according to claim 10, wherein:

when informed from the recognizing means that the host device connected to the interface is not able to make differentiation between the recording medium and nonvolatile recording medium, the identification information table reading means selects the first identification information table from the nonvolatile recording medium; and when informed from the recognizing means that the host device connected to the interface is able to make differentiation between the recording medium and nonvolatile recording medium, the identification information table reading means selects the first and second identification information tables from the nonvolatile recording medium.

12. A method of writing data to a composite memory device including a recording medium having a first data area assigned a first physical address, a nonvolatile recording medium having a second data area assigned a second physical address, a first identification information table having a second data area assigned a second physical address and having predetermined identification information written at the first logical address and a second identification information table assigned a second logical address corresponding to the second physical address and having predetermined identification information written at the second logical address, and an interface to which a host device is to be connected, the method comprising:

a recognizing step of recognizing a host device connected to the interface;

an identification information table reading step of reading the first and second identification information tables from the nonvolatile recording medium on the basis of the result of recognition supplied from the recognizing step;

a first information selecting step of selecting the first logical address where the predetermined identification information is written from the first identification information table read in the identification information table reading step;

a second information selecting step of selecting the second logical address where the predetermined identification information is written from the second identification information table read in the identification information table reading step on the basis of the result of recognition supplied from the recognizing step;

a conversion table generating step of generating a conversion table in which the first logical address selected in the first information selecting step and second logical address selected by the second information selecting means are associated with each other;

a converting step of converting the first logical address selected in the first identification information selecting step into a first predetermined physical address corresponding to the first data area and the second logical address selected in the second information selecting step into a second predetermined physical address corresponding to the second data area;

a data allocating step of allocating data supplied from the host device connected to the interface to the first or second data area on the basis of the conversion made in the converting means;

a first writing step of writing the data allocated to the first data area in the data allocating step at a predetermined location in the first data area on the basis of the first physical address converted in the converting step;

a second writing step of writing the data allocated to the second data area in the data allocating step at a predetermined location in the second data area on the basis of the second physical address converted in the converting step; and a third writing step of writing data written in the second data area in the second writing step at a predetermined location in the first data area on the basis of the conversion table generated in the conversion table generating step.

13. A program for having a computer write to a composite memory device including a recording medium having a first data area assigned a first physical address, a nonvolatile recording medium having a second data area assigned a second physical address, a first identification information table having a second data area assigned a second physical address and having predetermined identification information written at the first logical address and a second identification information table having a second logical address corresponding to the second physical address and having predetermined identification information written at the second logical address, and an interface to which a host device is to be connected, the method comprising:

a recognizing step of recognizing a host device connected to the interface;

an identification information table reading step of reading the first and second identification information tables from the nonvolatile recording medium on the basis of the result of recognition supplied from the recognizing step;

a first information selecting step of selecting the first logical address where the predetermined identification information is written from the first identification information table read in the identification information table reading step;

a second information selecting step of selecting the second logical address where the predetermined identification information is written from the second identification information table read in the identification information table reading step on the basis of the result of recognition supplied from the recognizing step;

a conversion table generating step of generating a conversion table in which the first logical address selected in the first information selecting step and second logical address selected by the second information selecting means are associated with each other;

a converting step of converting the first logical address selected in the first identification information selecting step into a first predetermined physical address corresponding to the first data area and the second logical address selected in the second information selecting step into a second predetermined physical address corresponding to the second data area;

a data allocating step of allocating data supplied from the host device connected to the interface to the first or second data area on the basis of the conversion made in the converting means;

a first writing step of writing the data allocated to the first data area in the data allocating step at a predetermined location in the first data area on the basis of the first physical address converted in the converting step;

a second writing step of writing the data allocated to the second data area in the data allocating step at a predetermined location in the second data area on the basis of the second physical address converted in the converting step; and a third writing step of writing data written in the second data area in the second writing step at a predetermined location in the first data area on the basis of the conversion table generated in the conversion table generating step.

* * * * *